US007023865B2

(12) United States Patent
Matsuoka et al.

(10) Patent No.: US 7,023,865 B2
(45) Date of Patent: Apr. 4, 2006

(54) PACKET SWITCH

(75) Inventors: Naoki Matsuoka, Kawasaki (JP);
Hiroshi Tomonaga, Kawasaki (JP);
Kenichi Kawarai, Kawasaki (JP);
Masakatsu Nagata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 810 days.

(21) Appl. No.: 09/942,979

(22) Filed: Aug. 30, 2001

(65) Prior Publication Data

US 2003/0147398 A9    Aug. 7, 2003

(30) Foreign Application Priority Data

Dec. 26, 2000    (JP)    ............................. 2000-395741

(51) Int. Cl.
*H04L 12/28*    (2006.01)
*H04L 12/56*    (2006.01)

(52) U.S. Cl. ...................................... 370/412; 370/415
(58) Field of Classification Search ..............................
370/395.4–395.43, 412–416, 417, 428, 389, 370/429, 468
See application file for complete search history.

(56) References Cited

U.S. PATENT DOCUMENTS

| 5,465,348 | A | | 11/1995 | Amemiya et al. | |
|---|---|---|---|---|---|
| 6,185,188 | B1 | * | 2/2001 | Hasegawa | .................. 370/235 |
| 6,438,134 | B1 | * | 8/2002 | Chow et al. | ................. 370/412 |
| 6,813,274 | B1 | * | 11/2004 | Suzuki et al. | ................ 370/412 |
| 2001/0007562 | A1 | * | 7/2001 | Matsuoka et al. | ........... 370/415 |
| 2002/0039364 | A1 | * | 4/2002 | Kamiya et al. | ............. 370/389 |

FOREIGN PATENT DOCUMENTS

| EP | 0 569 172 | 11/1993 |
|---|---|---|
| JP | 06097965 | 4/1994 |
| JP | 200138687 | 5/2000 |
| WO | 00/64109 | 10/2000 |

OTHER PUBLICATIONS

Kirstadter, "Fair and Flexible Contention Resolution for Input Buffered ATM Switches Based on LAN Medium Access Control Protocols" Broadband Communications: Global Infrastructure for the Information age. Proceedings of the International IFIP-IEEE Conference on Broadband Communications Apr. 23, 1996, XP010525736; ISBN: 0-412-75970-5; pp. 370-381.

Serpanos, et al., "High-Speed Cell Scheduling for Router Backplanes" Proceedings of the IEEE Conference 2000 on High Performance Switching and Routing. Jun. 26-29, 2000; XP001075687; ISBN: 0-7803-5884-8, pp. 65-71.

(Continued)

*Primary Examiner*—Ajit Patel
(74) *Attorney, Agent, or Firm*—Katten Muchin Rosenman LLP

(57) ABSTRACT

A packet switch which can cyclically use α scheduling process results to determine one of M output lines as a destination of a packet stored in each of N input buffer sections by α scheduler sections independently performing scheduling processes is disclosed.

14 Claims, 23 Drawing Sheets

OTHER PUBLICATIONS

Duan, et al., "A High-Performance OC-12/OC-48 Queue Design Prototype for Input-Buffered ATM Switches" Infocom 97. Sixteenth Annual Joint Conference of the IEEE Computer and Communications Societies. Driving the Information Revolution. , Proceedings IEEE Apr. 7-11, 1997; XP010252017; ISBN: 0-8186-7780-5, pp. 20-28.

Wong, et al., "A Programmable Rate-Based Scheduler (PRS) for ATM Switches and Multiplexers" Global Telecommunications Conference, 1997. Nov. 1997; XP010254750, ISBN: 0-7803-4198-8; pp. 827-832.

Ermedahl, et al., "Response-Time Guarantees in ATM Networks" Real-Time Systems Symposium, Dec. 1997 XP010260397; ISBN: 0-8186-8268-X, pp. 274-284.

Byung Kook Kim, et al., "Scalable Hardware Earliest-Deadline-First Scheduler for ATM Switching Networks" Real-Time Systems Symposium, Dec. 1997 XP010260391, ISBN: 0-8186-8268-X, pp. 210-218.

* cited by examiner

FIG. 16

| | PERIOD A | PERIOD B | PERIOD C | PERIOD D | PERIOD E | PERIOD F | PERIOD G |
|---|---|---|---|---|---|---|---|
| SCH#0 | 0 | 0 | 0 | 0 | 0 | 0 | 0 |
| SCH#1 | 1 | 1 (ERROR) | 1 | 1 (RECOVER) | 1 | 1 | 1 |
| SCH#2 | 2 | 2 | 2 | 2 | 2 | 2 | 2 |
| SCH#3 | 3 | 3 | 3 | 3 | 3 | 3 | 3 |
| SCH#4 (STANDBY) | 4 | 4 | 4 | 4 | 4 | 4 | 4 |
| USE OF SCHEDULING RESULT | - - - - 0 1 2 3 | 0 1 2 3 | 0 4 2 3 | 0 4 2 3 | 0 1 2 3 | 0 1 2 3 | 0 1 2 3 |

PERIOD OF ERROR

PACKET SWITCH

BACKGROUND OF THE INVENTION

The present invention relates to a packet switch for outputting packets input through an input line after allocating them to a plurality of output lines.

With an increasing number of Internet users at home and with the remarkable growth of Internet business, an Internet backbone network of a larger capacity and higher quality is strongly demanded. Currently, Internet is mainly operated in best-effort communications without quality guarantee. However, Internet in the future generation is expected to provide real time data communications using voice, video data, etc. in addition to the best-effort communications. Therefore, it is necessary for a network node to provide the service quality QoS (Quality of Service) appropriate for various communications services by acquiring a terabit switching capacity with which various types of traffic can be flexibly accommodated. It is considered that the probable means for realizing a node having a terabit switching capacity is an input buffer packet switch capable of performing a process at a high memory access speed.

Various scheduling algorithms have been conventionally suggested for input buffer packet switches. They can be roughly grouped into the following two methods based on the assignment of scheduling functions, that is, a method of distributing and assigning the scheduling functions to interface cards, etc. and a method of assigning the scheduling functions collectively to exclusive cards, etc.

FIGS. 22 and 23 show the distribution of the scheduling functions in the conventional input buffer packet switch. FIG. 22 shows the configuration of the packet switch in which the scheduling functions are distributed and fed. FIG. 23 shows the configuration of the packet switch in which the scheduling functions are collectively assigned.

As shown in FIG. 22, the input buffer packet switch in which the scheduling functions are distributed and assigned includes an interface card 100 containing an input buffer and a scheduler for each input line. The scheduling information can be transmitted and received (a notification of an undefined line can be given) among schedulers by interconnecting the schedulers in the adjacent interface cards 100, and the scheduling process can be performed for all input lines. When the number of input lines increases or decrease, the number of interface cards 100 can also be increased or decreased to be equal to the number of the input lines. Therefore, the input buffer packet switch with the configuration shown in FIG. 22 excels in extensibility.

On the other hand, as shown in FIG. 23, the input buffer packet switch in which the scheduling functions are collectively assigned includes a scheduling function section for all input lines collectively in one scheduler card 110, thereby performing a scheduling process on all input lines. Since the length of the wiring between the scheduling function sections is short, the wiring reduces a delay, and the restrictions placed by the delay time of a signal when the switch is installed can be considerably reduced.

However, since it is necessary for the conventional input buffer packet switch in which the scheduling functions are distributed and assigned to interconnect the schedulers provided in each of the installed interface cards 100, the length of the connection line causes a delay, thereby placing more restrictions when a high-speed packet switch is installed.

In the conventional input buffer packet switch in which the scheduling function sections are collectively assigned, it is necessary for the scheduler card 110 to be provided with the largest possible number of scheduling function sections even when there are a small number of the input lines actually. After installing the scheduling function sections, the number of the sections is fixed. Therefore, this switch is wasteful and poor in extensibility.

SUMMARY OF THE INVENTION

The present invention has been achieved to solve the above mentioned problems, and aims at providing a packet switch which has less restrictions when it is installed, and can reduce a wasteful configuration, and excels in extensibility.

The packet switch according to the present invention includes N input buffer sections and α scheduler sections, and switch section. The N input buffer sections are provided respectively for N input lines, and store packets input through the corresponding input lines. The α scheduler sections independently perform respective scheduling processes, and each section determines an output line among the M output lines to which the packet stored in each of the N input buffer sections is transmitted. A switch section outputs the packet output from each of the N input buffer sections to the output line determined by the scheduler sections. The above mentioned N input buffer sections cyclically use the results of the scheduling processes performed by the α scheduler sections. Since the plurality of scheduler sections independently perform the scheduling processes, it is not necessary to control the conflict among the scheduler sections, etc., thereby causing no problem of signal delays, etc. and considerably reducing the restrictions when the switch is installed. Furthermore, since only the scheduler sections of the necessary number are to be provided, a wasteful configuration can be avoided. Additionally, since the scheduler sections can be added later, an extensible packet switch can be realized.

Especially, the scheduling process is performed by the above mentioned scheduler section in response to the scheduling request notification transmitted from the N input buffer sections. It is desired that each of the N input buffer sections distributes the scheduling request notification to a different scheduler section. By distributing the scheduling request notification to a different scheduler section, the loads of the processes can be equally distributed among the scheduler sections.

Furthermore, the above mentioned input buffer sections have M queues storing the packets to be transmitted to the M output lines. It is desired that the scheduling request notification is cyclically transmitted to the scheduler sections for each of the M queues. By transmitting the scheduling request notification cyclically to the scheduler sections for each of the M queues, the scheduling request notification can be distributed equally among the scheduler sections.

It is also desired that the above mentioned input buffer section transmits the scheduling request notification cyclically to the scheduler sections for each input line. By transmitting the scheduling request notification cyclically to the scheduler sections for each input line, the scheduling request notification can be distributed equally among the scheduler sections.

It is desired that the above mentioned input buffer section transmits the scheduling request notification cyclically to the scheduler sections for each unit time. By transmitting the scheduling request notification cyclically to the scheduler sections for each unit time, the scheduling request notification can be distributed equally among the scheduler sections.

It is further desired that the above mentioned input buffer section checks the number of unprocessed scheduling request notifications for each of the α scheduler sections such that the next scheduling request notification can be transmitted to the scheduler section of the smallest number. By transmitting a scheduling request notification by priority to the scheduler section having the smallest number of actually received scheduling request notifications, the scheduling request notifications can be distributed equally among the scheduler sections.

It is further desired that the above mentioned input buffer section manages the number of scheduling request notifications transmitted to each of the α scheduler sections such that the operation of transmitting a scheduling request notification to the scheduler section having the number equal to or larger than a predetermined number of scheduling request notifications can be delayed until the number becomes smaller than the predetermined number. By the input buffer section distributing the function of managing the number of scheduling request notifications, the load of each scheduler section can be reduced.

When the time required by the scheduler section to perform the scheduling process is L times as long as the smallest transmission intervals of packets, it is desired that the number α of the scheduler sections is set to a value equal to or larger than a multiple L. By setting the number α of the scheduler sections to a value equal to or larger than a multiple L, the scheduling process can be performed without delay as the entire α scheduler sections.

Furthermore, it is desired that L-α is equal to or larger than 1 (that is, there are L or more schedulers), and N input buffer sections cyclically use the results of the scheduling processes of all of α scheduler sections. By setting the number of scheduler sections to a value larger than the threshold required to avoid the delay in performing a process, remaining scheduler sections can normally continue the scheduling process even if a part of the entire scheduler sections become faulty.

It is also desired that, when L-α is set to equal to or larger than 1, α-L scheduler sections are used as a redundant system so that, when the scheduler sections other than the redundant system become faulty, the scheduler sections in the redundant system can replace the faulty sections. By performing the scheduling process by the scheduler sections in the redundant system when a fault occurs, the scheduling process can be normally continued without delay.

Furthermore, it is desired to set each of the number α of the scheduler sections and the time required for the scheduling process variable depending on the number N of input lines and the number M of output lines. When the number of lines is small, the number of scheduler sections and the processing time are set to small values. On the other hand, when the number of lines is large, the number of scheduler sections and the processing time are set to large values. Thus, the optimum configuration can be realized without waste depending on the number of lines, etc. accommodated by the switch section.

It is further desired that the above mentioned scheduler sections perform the scheduling process using lines including unused lines so that a plurality of results of scheduling processes can be obtained from one scheduling process by switching lines between the unused lines and the actually used input and output lines. Thus, the number of lines can be changed without changing the number of scheduler sections or the processing time, thereby realizing an extensible packet switch.

BRIEF DESCRIPTION OF THE DRAWINGS

FIG. 16 shows a practical example the scheduler sections of a redundant system are fixed;

DESCRIPTION OF THE PREFERRED EMBODIMENTS

Described below in detail are embodiments of the present invention.

Figure 1:
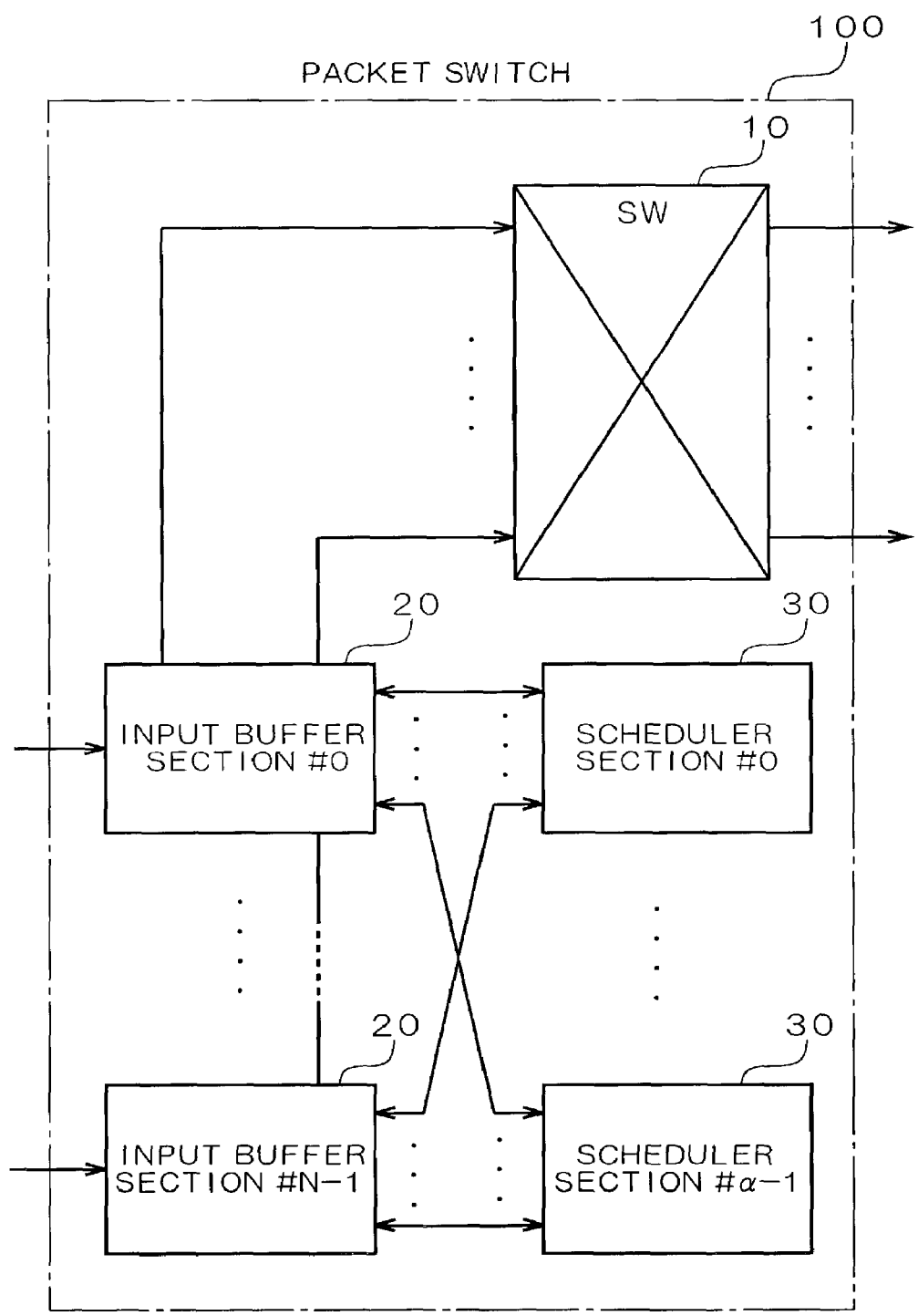
FIG. 1 shows a configuration of a packet switch according to an embodiment of the present invention.

FIG. 1 shows a configuration of the packet switch according to an embodiment of the present invention. As shown in FIG. 1, a packet switch 100 according to an embodiment of the present invention comprises a switch section (SW) 10, N input buffer sections 20, and α scheduler sections 30.

The switch section 10 outputs a packet input through one of the N input lines to one of the M output lines. According to the present embodiment, the switch section 10 includes no buffer, and cannot store a packet. Each of the N input buffer sections 20 is provided respectively corresponding to each of the N input lines accommodated in the switch section 10. Each of the input buffer sections 20 is provided with M logic queues VOQ (Virtual Output Queue) corresponding to the M output lines accommodated by the switch section 10, accumulates a received packet input through a one-to-one corresponding input line in the logic queue VOQ corresponding to the destination output line, and reads the leading packet in the logic queue VOQ specified by a grant notification which indicates the permission to output a packet, and is transmitted from any of the scheduler sections 30. Each of the α scheduler sections 30 performs a scheduling process to determine a destination output line of a packet input through each input line. Thus, by concurrently performing scheduling processes in α scheduler sections 30, the load of the process performed by each scheduler section 30 can be reduced. In the present specification, the scheduling processes performed by the plurality of scheduler sections 30 are referred to as a load-distributed scheduling process.

Figure 2:
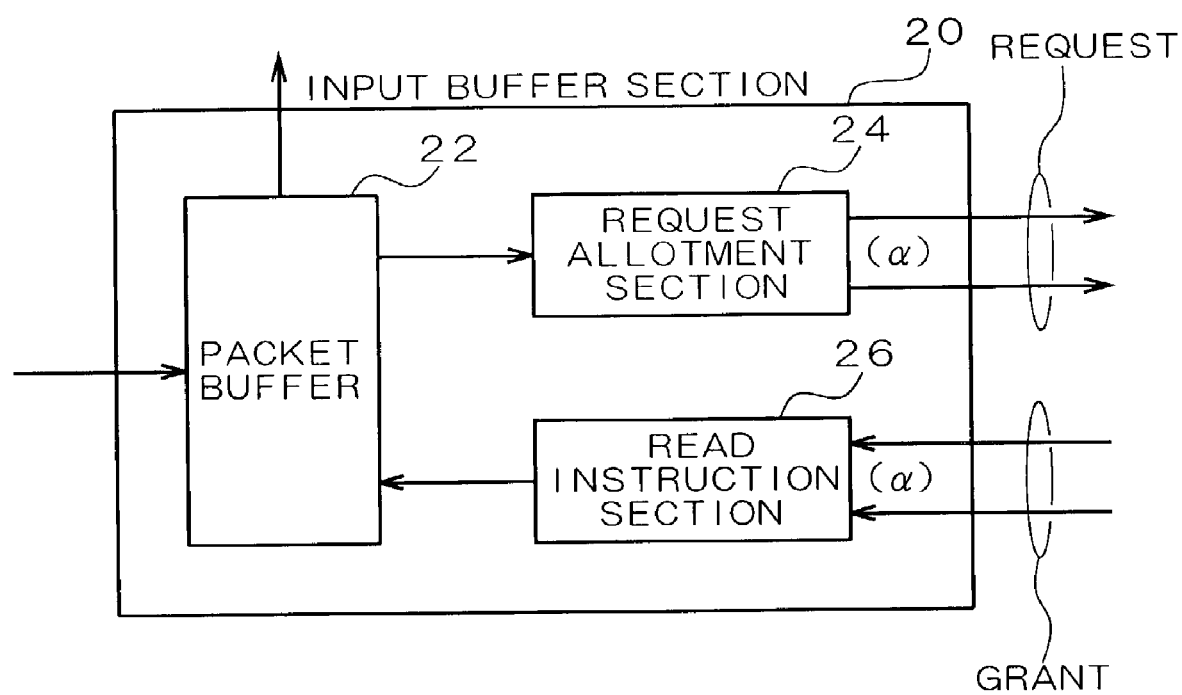
FIG. 2 shows a detailed configuration of an input buffer section.

FIG. 2 shows a detailed configuration of the input buffer section 20. As shown in FIG. 2, the input buffer section 20 comprises a packet buffer 22 including the above mentioned M logic queues VOQ, a request allotment section 24, and a read instruction section 26. The request allotment section 24 distributes request notifications which are the scheduling request notifications corresponding to the packets accumulated in each logic queue VOQ in the packet buffer 22 equally to the α scheduler sections 30. The read instruction section 26 issues a read instruction to the logic queue VOQ in the packet buffer 22 whose packet transmission timing is reached based on the contents of the grant notifications transmitted from the α scheduler sections 30.

Figure 3:
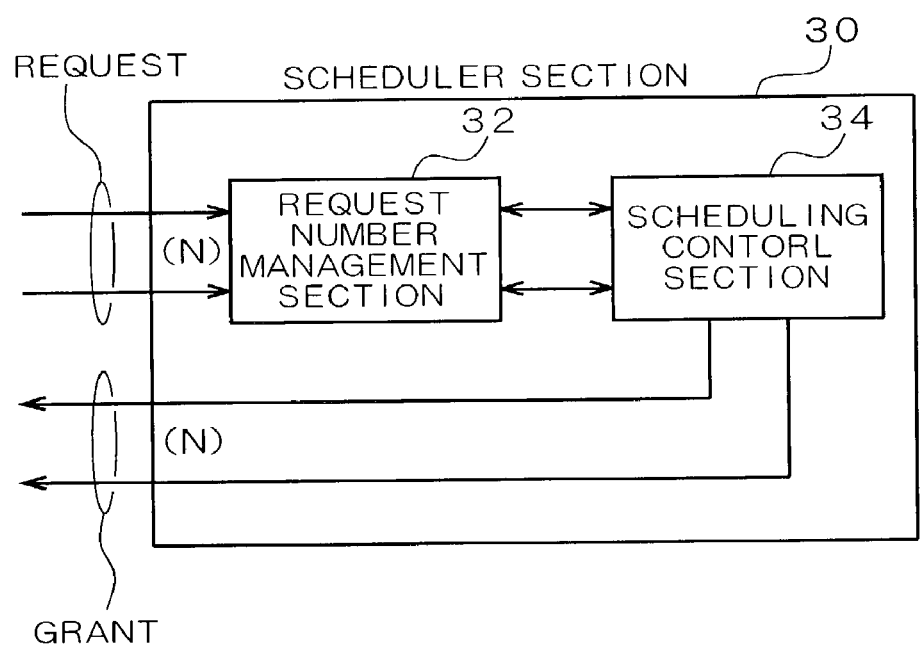
FIG. 3 shows a detailed configuration of a scheduler section.

FIG. 3 shows a detailed configuration of the scheduler section 30. As shown in FIG. 3, the scheduler section 30 comprises a request number management section 32 and a scheduling control section 34. The request number management section 32 increments the number of requests corresponding to the combination of an input line and a logic queue VOQ when a request notification corresponding to the combination is received, and decrements the number of requests when the scheduling process is specified. The scheduling control section 34 determines the destination output lines of the packet to be output at a timing T from each input line according to a predetermined algorithm. Practically, the scheduling control section 34 selects one of the output lines having the number of requests counted by the request number management section 32 equal to or larger than 1 for each input line.

Since the scheduling processes are concurrently performed by the α scheduler sections 30 according to the present embodiment, each scheduler section 30 can perform the scheduling process taking its time a times as long as the time taken by the scheduling process performed by one scheduler section. For example, assuming that the time required to transmit a packet input through each input line to a corresponding output line is 'one packet hour', each scheduler section 30 can perform within α packet hours the scheduling process of determining a destination output line of a packet input through each of the N input lines.

The packet switch 100 according to the present embodiment has the above mentioned configuration. Described below is the scheduling process of the packet switch.

(1) Operations of the Input Buffer Section 20

(1a) When a packet is input through a corresponding input line, the packet buffer 22 stores the packet in the logic queue VOQ corresponding to the destination output line of the packet.

(1b) When a packet is stored in any of the logic queues VOQ in the packet buffer 22, the request allotment section 24 transmits a request notification requesting the scheduling process corresponding to the packet to one scheduler section 30. At this time, the scheduler section 30 to which the request notification is transmitted is distributed.

(1c) When a grant notification is received from any of the scheduler sections 30, the read instruction section 26 instructs the packet buffer 22 to output the leading packet in the logic queue VOQ specified by the grant notification to the output line one-to-one corresponding to the logic queue VOQ.

(2) Operations of the Scheduler Section 30

The operations of the α scheduler section 30 are independent of each other, and the number of request notifications (number of requests) received from each input buffer section 20 is managed for each logic queue VOQ. Therefore, each scheduler section 30 performs a scheduling process depending on whether or not there is a request notification addressed to itself. The scheduling algorithm can adopt various conventional methods. Described below is the operation of selecting a logic queue VOQ for each output line in the round-robin scheduling.

(2a) When a request notification is received from each input buffer section 20, the request number management section 32 checks the contents of the request notification, and counts the number of requests for each combination of an input line and a logic queue VOQ.

(2b) The scheduling control section 34 pays its attention to one input line, and selects one of the logic queues VOQ which is specified by the received request notification, and has not been selected (specified) in the preceding scheduling processes. The process of selecting a logic queue VOQ for each input line is sequentially performed cyclically on all input lines. Thus, the destination output line of each of the input packets can be determined.

(2c) The scheduling control section 34 transmits a grant notification with the logic queue VOQ specified for each input line to the read instruction section 26 in each input buffer section 20.

PRACTICAL EXAMPLE 1

Figure 4:
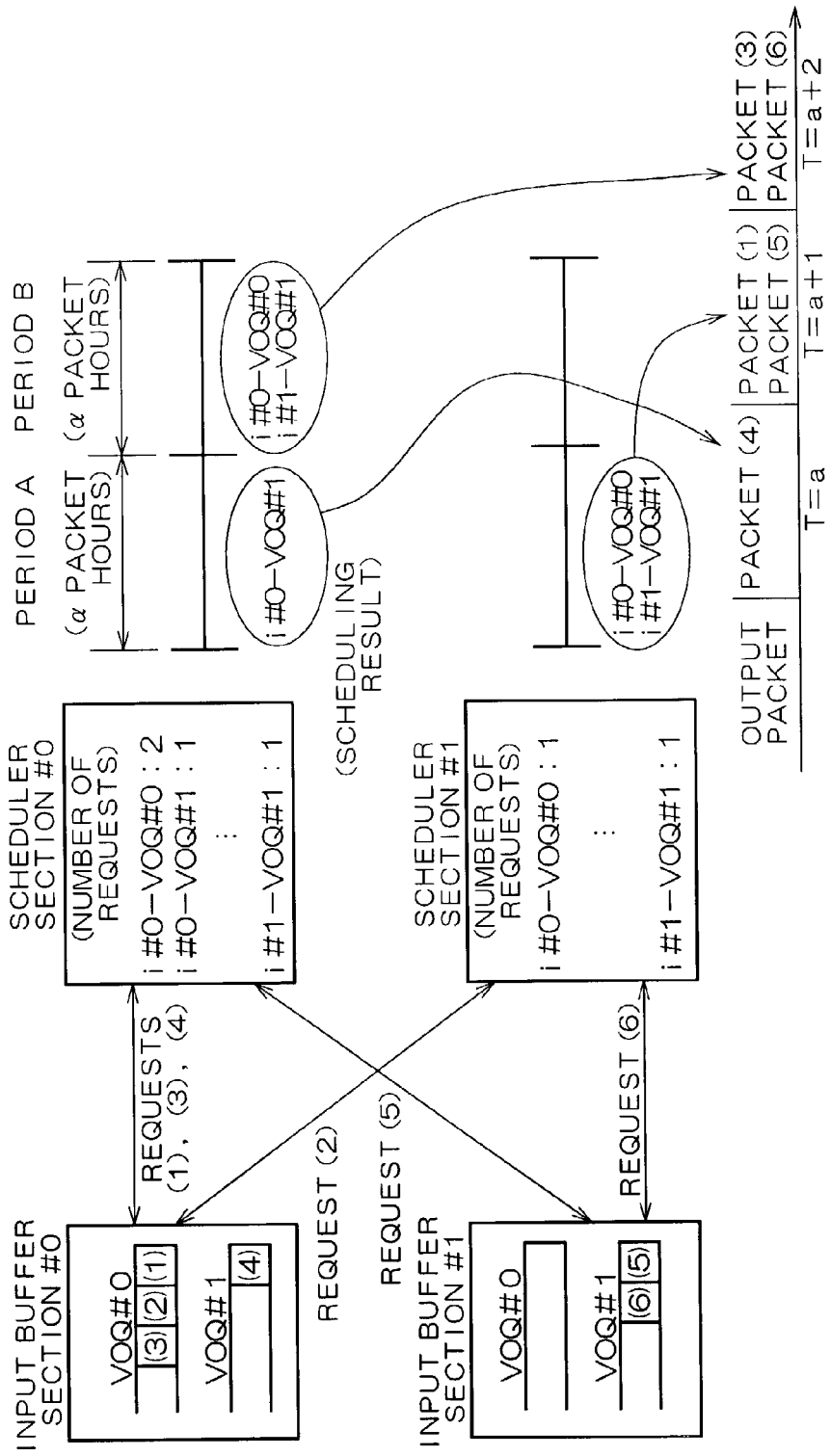
FIG. 4 shows a practical example of a load-distributed scheduling process.

FIG. 4 shows a practical example of a load-distributed scheduling process. FIG. 4 shows a practical example of a scheduling process in which the number α of the input lines, the output lines, and the scheduler sections 30 is 2 for simple explanation. In the following explanation and FIG. 4, two input lines, two output lines and the logic queues VOQ corresponding to each of the output lines are assigned the serial numbers of #0 and #1 for identification. One of the two scheduler sections 30 is referred to as a scheduler #0

(SCH#0), and the other as a scheduler #1 (SCH#1). Similarly, one of the two input buffer sections 20 corresponding to the input lines #0 and #1 is referred to as an input buffer section #0, and the other as an input buffer section #1. Each configuration included in them are assigned either #0 or #1 after each name for identification of a corresponding input line.

Operations of the Input Buffer Sections

One input buffer section #0 sequentially receives four packets (1), (2), (3), and (4) through an input line #0. Among them, the first, second, and third packets (1), (2), and (3) are assigned the destination output line #0, and only the fourth packet (4) is assigned the output line #1. Therefore, the packet buffer #0 in the input buffer section #0 stores the first, second, and third packets (1), (2), and (3) in the logic queue VOQ #0, and the fourth packet (4) in the logic queue VOQ #1. The request allotment section #0 transmits a request notification to one scheduler section #0 upon receipt of the first, third, and fourth packets (1), (3), and (4), and transmits a request notification to the other scheduler section #1 upon receipt of the second packet (2). The request notification includes an input line number, an output line number (number of a logic queue VOQ), 'enable', etc.

The other input buffer section #1 sequentially receives the fifth and sixth packets (5) and (6) through the input line #1. These two packets (5) and (6) are assigned the destination output line #1. Therefore, the packet buffer #1 in the input buffer section #1 stores these fifth and sixth packets (5) and (6) in the logic queue VOQ #1. The request allotment section #1 transmits a request notification to one scheduler section #0 upon receipt of the fifth packet (5), and transmits a request notification to the other scheduler section #1 upon receipt of the sixth packet (6).

Operations of the Scheduler Sections

The scheduler sections #0 and #1 independently operate, and manage the number of received request notifications for each logic queue VOQ by the included request management sections #0 and #1. The scheduler sections #0 and #1 perform load-distributed scheduling processes described below depending on the number of the requests managed by the request management sections #0 and #1. It is assumed that the scheduling processes performed by the round-robin scheduling system are performed in the order of the input line #1 and the input line #0.

For example, the scheduling control section #1 in the scheduler section #1 first determines whether or not there is a request notification about all logic queues VOQ corresponding to the input line #1, and selects by the round-robin scheduling system one of the logic queues VOQ which has received a request notification but has not been assigned the destination of a packet. In the example shown in FIG. 4, only a request notification corresponding to the logic queue VOQ #1 is issued relating to the input line #1 (i#1). However, since the logic queue VOQ #1 has not been assigned, the logic queue VOQ #1 is selected.

Then, the scheduling control section #1 in the scheduler section #1 determines that the logic queue VOQ #1 selected in the above mentioned process has been entered as an assigned queue, and performs a similar scheduling process on the next input line #0 as a different input line number. In the example shown in FIG. 4, request notifications corresponding to the logic queues VOQ #0 and #1 have been issued relating to the input line #0. Since the logic queue VOQ #1 has been assigned, the logic queue VOQ #0 is selected.

Thus, the scheduling control section #1 in the scheduler section #1 performs the scheduling processes for all input lines within α (=2) packet hours.

Similarly, in the scheduling control section #0 in the scheduler section #0, the scheduling processes are performed for all input lines within a packet hours. As a result, the scheduling results of the scheduler sections #0 and #1 in a period A are determined as follows.

scheduler section #0: input line #0→output line #1
    scheduler section #1: input line #0→output line #0
        input line #1→output line #1

Each scheduling result of each of α (two) scheduler sections #0 and #1 is transmitted as a grant notification to all input buffer sections #0 and #1. The read instruction sections #0 and #1 in the input buffer sections #0 and #1 cyclically use the scheduling results of the scheduler sections #0 and #1 alternately operated every one packet hour, and transmit an instruction to read a packet from the start of the logic queue VOQ corresponding to the output line specified as the destination of a packet to the packet buffers #0 and #1.

In the example shown in FIG. 4, in the period B to be performed after the period A in which the above mentioned scheduling process has been performed, the scheduling result of the scheduler section #0 is used in the first 1 packet hour (T=a). That is, the leading packet (fourth packet (4)) in the logic queue VOQ #1 in the input buffer section #0 is transmitted to the output line #1.

In the next 1 packet hour (T=a+1) in the period B, the scheduling result of the scheduler section #1 is used. That is, the leading packet (first packet (1)) in the logic queue VOQ #0 in the input buffer section #0 is transmitted to the output line #0, and the leading packet (fifth packet (5)) in the logic queue VOQ #1 in the input buffer section #1 is transmitted to the output line #1.

It is apparent that the request notification transmitted from each of the input buffer sections #0 and #1 does not one-to-one correspond to an actually transmitted packet. For example, when the input buffer section #0 receives the first packet (1) and stores it in the logic queue VOQ #0, a request notification (1) is transmitted to the scheduler section #0. However, the first packet (1) is transmitted actually to the output line #0 at the timing of 1 packet hour (T=a+1) in the second half of the period B, and based on the scheduling result of the scheduler section #1. The above mentioned operations are performed to read the leading packet of the logic queue VOQ always in response to the grant notification transmitted regardless of the correspondence between the request notification and the grant notification to avoid the passing in the same logic queue VOQ or the influence of the HOL blocking, etc. by the distribution of request notifications between the scheduler sections #0 and #1.

PRACTICAL EXAMPLE 2

Figure 5:
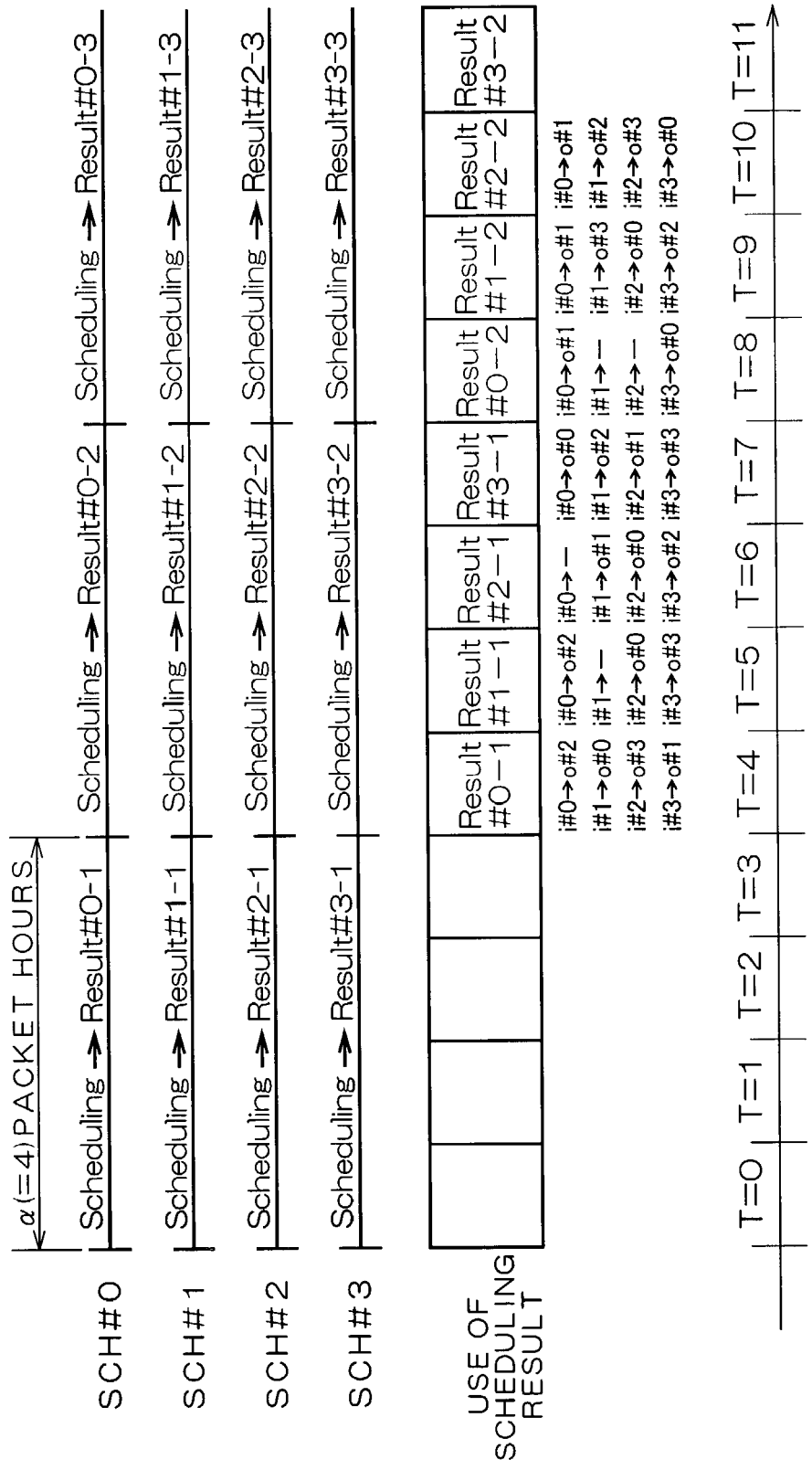
FIG. 5 shows another example of the load-distributed scheduling process.

FIG. 5 shows another practical example of the load-distributed scheduling process. The practical example is the scheduling process in which the number α of the input lines, the output lines, and the scheduler sections 30 is 4. In FIG. 5, the SCH #0 through SCH #3 respectively indicate the four scheduler sections 30 (scheduler sections #0 through #3). The 'Scheduling→Result #0-1' indicates that the scheduling result specified by the '#0-1' is obtained in the scheduling process.

In the practical example shown in FIG. 5, four scheduler sections #0 through #3 are independently performing scheduling processes, and four scheduling results (Result #0-1 through #3-1) are obtained at the end of the first period (T=0 through 3) corresponding to 4 packet hours. Based on these scheduling results, a packet is transmitted in the second period (T=4 through 7) corresponding to the next four packet hours.

Practically, in the first packet hour (T=4) in the second period, the scheduling result 'Result #0-1' by the scheduler section #0 (SCH #0) is used. As a result, a packet is transmitted based on the following contents. The left side items indicate the input lines through which packets are input. The right side items indicate to which output lines the packets are transmitted based on the scheduling results.

input line #0 (i#0)→output line #2 (o#2)
input line #1 (i#1)→output line #0 (o#0)
input line #2 (i#2)→output line #3 (o#3)
input line #3 (i#3)→output line #1 (o#1)

In the next packet hour (T=5) in the second period, the scheduling result 'Result #1-1' by the scheduler section #1 (SCH #1) is used. As a result, a packet is transmitted based on the following contents.

input line #0 (i#o)→output line #2 (o#2)
input line #1 (i#1)→(not transmitted yet)
input line #2 (i#2)→output line #0 (o#0)
input line #3 (i#3)→output line #3 (o#3)

In the next packet hour (T=6) in the second period, the scheduling result 'Result #2-1' by the scheduler section #2 (SCH #2) is used. As a result, a packet is transmitted based on the following contents.

input line #0 (i#0)→(not transmitted yet)
input line #1 (i#1)→output line #1 (o#1)
input line #2 (i#2)→output line #0 (o#0)
input line #3 (i#3)→output line #2 (o#2)

In the last packet hour (T=7) in the second period, the scheduling result 'Result #3-1' by the scheduler section #3 (SCH #3) is used. As a result, a packet is transmitted based on the following contents.

input line #0 (i#0)→output line #0 (o#0)
input line #1 (i#1)→output line #2 (o#2)
input line #2 (i#2)→output line #1 (o#1)
input line #3 (i#3)→output line #3 (o#3)

Thus, by the four scheduler sections #0 through #3 independently performing the scheduling processes, the scheduling results are used by the scheduler sections #0 through #3 at different timings although conflicting scheduling results are obtained, thereby causing no disadvantage. Therefore, it is not necessary to provide a connection line, etc. for conflict control among the scheduler sections #0 through #3. As a result, there is no problem of a signal delay due to the connection line, thereby considerably reducing the restrictions when the switch is installed. Furthermore, since it is necessary only to provide the required number of scheduler sections, the configuration is free of waste. Additionally, since the sections can be added later as necessary, an extensible packet switch 100 can be realized.

In the explanation above, the scheduling results obtained by the α scheduler sections #0, . . . , #α−1 are simultaneously transmitted to the respective input buffer sections, and each input buffer section cyclically uses the scheduling results by different scheduler sections every packet hour. However, it is also possible to transmit packets to the input buffer sections with the timings of transmitting scheduling results of the scheduler sections shifted by 1 packet hour for each scheduler section.

Distribution of Request Notifications

As described above, it is desired to distribute request notifications transmitted from the input buffer sections 20 equally in all scheduler sections 30 to perform the load-distributed scheduling process using α scheduler sections 30.

Described below is the method of distributing the request notifications from the input buffer section 20 to the scheduler section 30.

Figure 6:
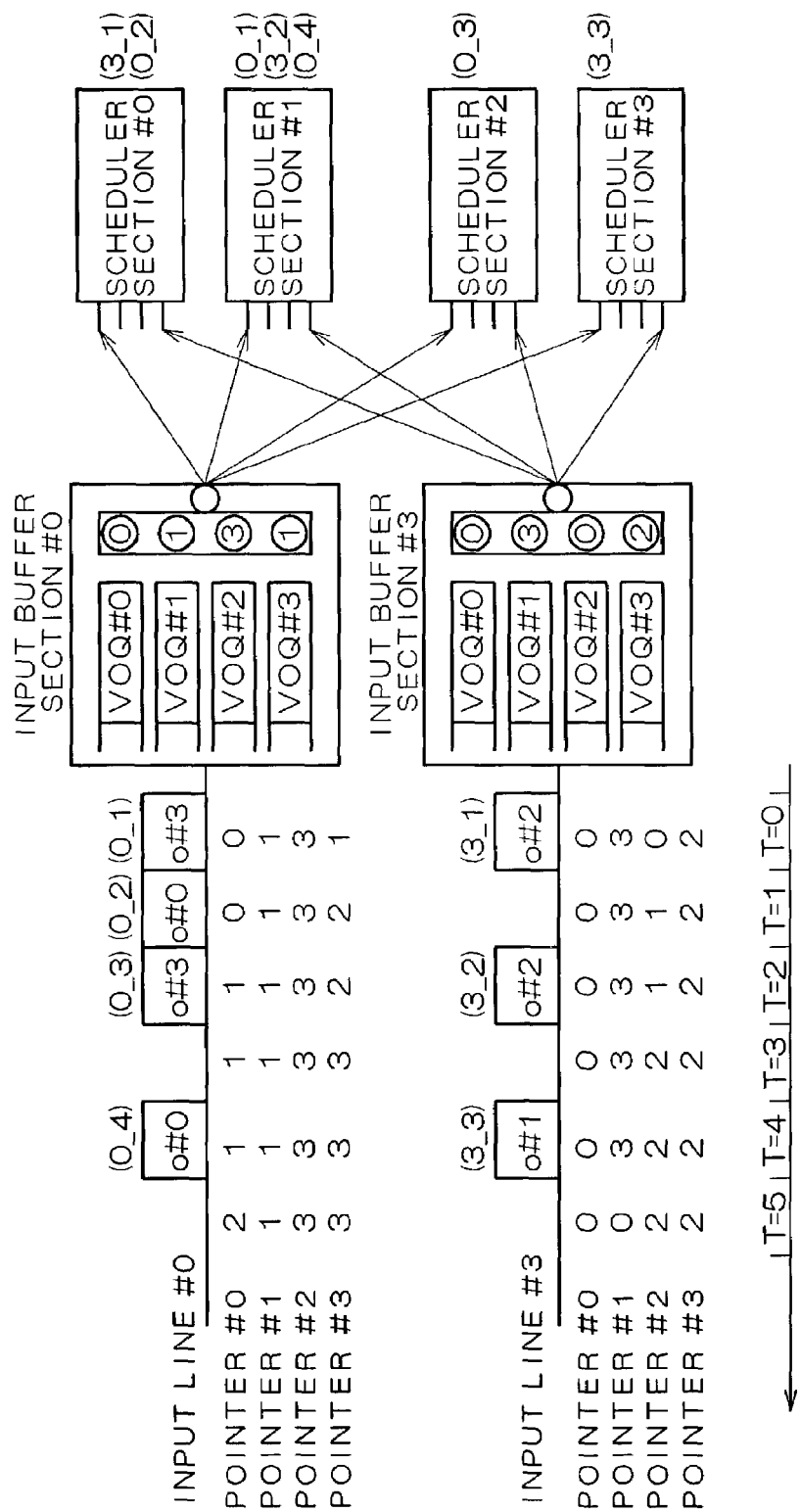
FIG. 6 shows a practical example of distributing request notifications for each logic queue.

When Request Notifications are Distributed for Each Logic Queue VOQ;

FIG. 6 shows a practical example of distributing request notifications for each logic queue VOQ in the input buffer section 20. In FIGS. 6 through 9, it is assumed that four input buffer sections 20 (#0 through #3) and four scheduler sections 30 (#0 through #3) are provided.

The request allotment sections #0 through #3 in the input buffer sections #0 through #3 have allotment pointers for each logic queue VOQ, and transmit request notifications to the scheduler sections indicated by the values of the allotment pointers when a packet is transmitted via an input line. In FIG. 6, the pointer values are indicated by the values enclosed by circles in the input buffer sections #0 and #3.

Described below are the practical operations of the request allotment section #0 in the input buffer section #0 corresponding to the input line #0. In the initial status, it is assumed that the values of the allotment pointers of the four logic queue #0 through #3 corresponding to the input line #0 are set to 0, 1, 3, and 1 respectively.

When T=0, upon receipt of the packet (0_1) with the output line #3 (o#3) specified as the destination, the packet buffer #0 stores the packet in the logic queue VOQ #3. The request allotment section #0 transmits a request notification to the scheduler section #1 corresponding to the value by referring to the value '1' of the allotment pointer corresponding to the logic queue VOQ #3. After transmitting the request notification, the value of the allotment pointer corresponding to the logic queue VOQ #3 is updated into 2.

When T=1, upon receipt of the packet (0_2) with the output line #0 (o#0) specified as the destination, the packet buffer #0 stores the packet in the logic queue VOQ #0. The request allotment section #0 transmits a request notification to the scheduler section #0 corresponding to the value by referring to the value '0' of the allotment pointer corresponding to the logic queue VOQ #0. After transmitting the request notification, the value of the allotment pointer corresponding to the logic queue VOQ #0 is updated into 1.

When T=2, upon receipt of the packet (0_3) with the output line #3 (o#3) specified as the destination, the packet buffer #0 stores the packet in the logic queue VOQ #3. The request allotment section #0 transmits a request notification to the scheduler section #2 corresponding to the value by referring to the value '2' of the allotment pointer corresponding to the logic queue VOQ #3 updated when T=0. After transmitting the request notification, the value of the allotment pointer corresponding to the logic queue VOQ #3 is updated into 3.

When T=4, upon receipt of the packet (0_4) with the output line #0 (o#0) specified as the destination, the packet buffer #0 stores the packet in the logic queue VOQ #0. The request allotment section #0 transmits a request notification to the scheduler section #1 corresponding to the value by referring to the value '1' of the allotment pointer corresponding to the logic queue VOQ #0 updated when T=1. After transmitting the request notification, the value of the allotment pointer corresponding to the logic queue VOQ #0 is updated into 2.

Thus, in each of the input buffer sections #0 through #3, the request notifications to be transmitted from the input buffer sections #0 to #N−1 can be distributed among the scheduler sections #0 to #α−1 by distributing the request notifications generated corresponding to one logic queue VOQ equally to α scheduler sections #0 to #α−1.

Figure 7:
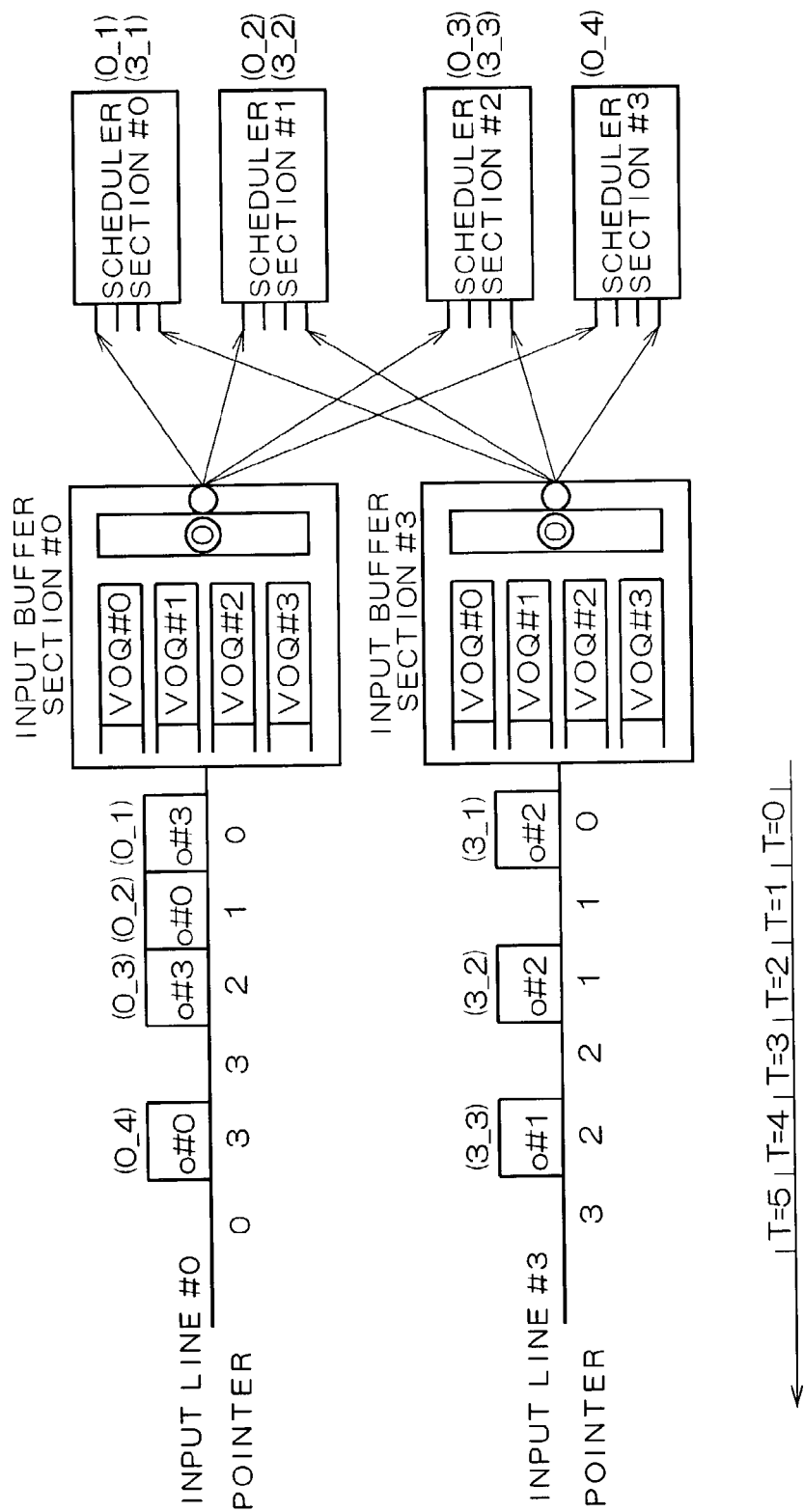
FIG. 7 shows a practical example of distributing request notifications for each input line.

When Request Notifications are Distributed for Each Input Line;

FIG. 7 shows a practical example of distributing request notifications for each input line.

The request allotment sections #0 through #3 in the input buffer sections #0 through #3 have a shared allotment pointer for all logic queues VOQ, and transmit request notifications to the scheduler sections #0 through #3 indicated by the values of the allotment pointers when a packet is transmitted via an input line. In FIG. 7, the pointer values are indicated by the values enclosed by circles in the input buffer sections #0 and #3.

Described below are the practical operations of the request allotment section #0 in the input buffer section #0 corresponding to the input line #0. In the initial status, it is assumed that the values of the allotment pointers corresponding to the input line #0 are set to 0.

When T=0, upon receipt of the packet (0_1) with the output line #3 (o#3) specified as the destination, the packet buffer #0 stores the packet in the logic queue VOQ #3. The request allotment section #0 transmits a request notification to the scheduler section #0 corresponding to the value by referring to the value '0' of the shared allotment pointer. After transmitting the request notification, the value of the allotment pointer is updated into 1.

When T=1, upon receipt of the packet (0_2) with the output line #0 (o#0) specified as the destination, the packet buffer #0 stores the packet in the logic queue VOQ #0. The request allotment section #0 transmits a request notification to the scheduler section #1 corresponding to the value by referring to the value '1' of the allotment pointer updated when T=0. After transmitting the request notification, the value of the allotment pointer is further updated into 2.

Similar operations are performed when and after T=2. That is, when a packet is received and stored in any logic queue VOQ, the destination scheduler section #0 through #3 of a request notification is determined by referring to the value of the shared allotment pointer.

Thus, each of the input buffer sections #0 through #3 can distribute the request notifications to be transmitted from each of the input buffer sections #0 through #N−1 among the destination scheduler sections #0 through #α−1 by distributing the request notifications generated corresponding to each logic queue VOQ equally among α scheduler sections #0 through #α−1 using a shared allotment pointer.

Figure 8:
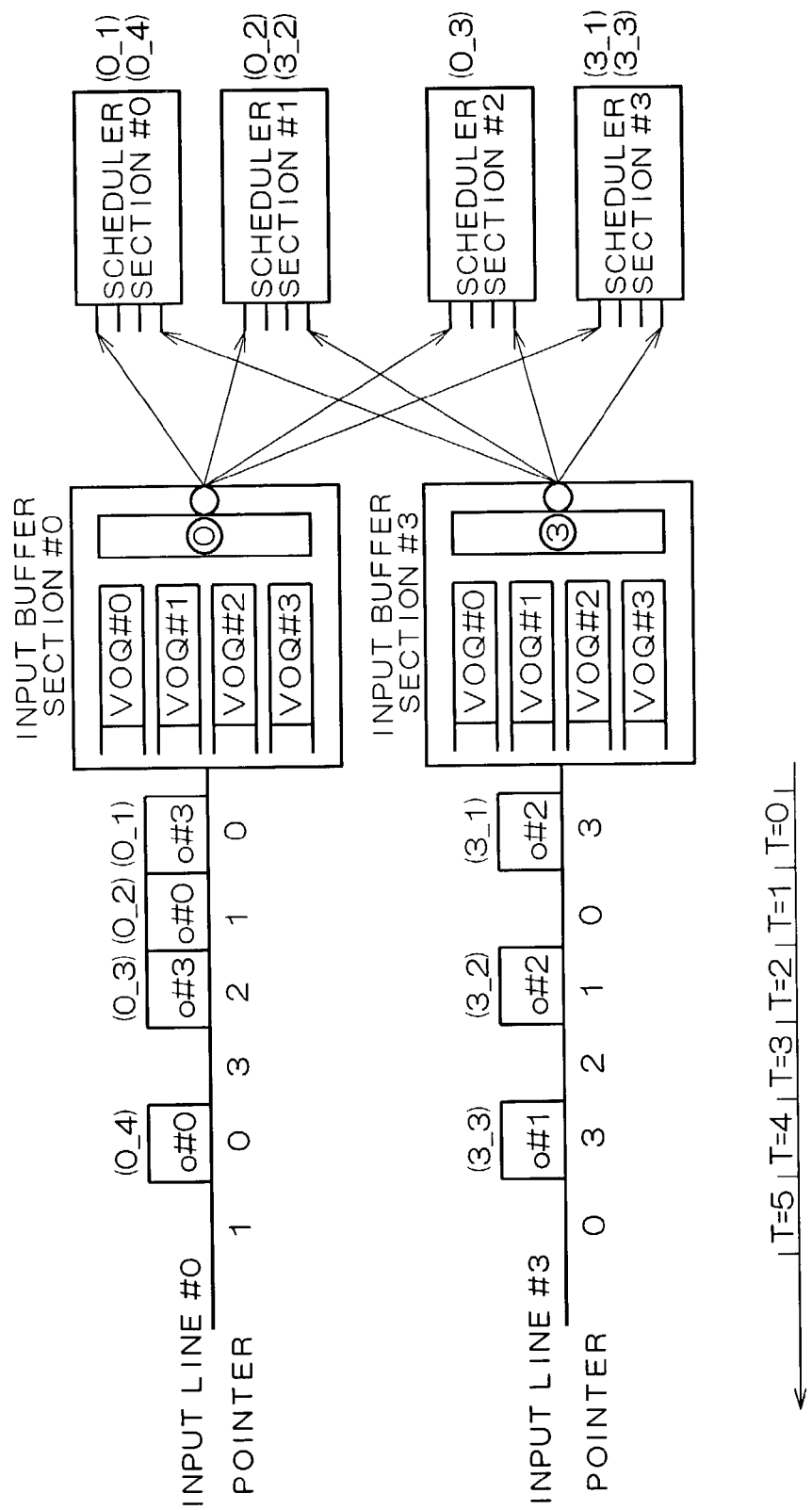
FIG. 8 shows a practical example of distributing request notifications for each unit time.

When request notifications are distributed for each unit time FIG. 8 shows a practical example of distributing request notifications for each unit time.

The request allotment sections #0 through #3 in each of the input buffer sections #0 through #3 has an allotment pointer to be updated for each unit time (for each packet hour), and transmits a request notification to the scheduler section pointed to by the allotment pointer when a packet is received through an input line. FIG. 8 shows the pointer value by a value enclosed by a circle in the input buffer sections #0 and #3.

Described below is the practical operations performed by the request allotment section #0 in the input buffer section #0 corresponding to the input line #0. It is assumed that the value of the allotment pointer is set to 0 corresponding to T=0.

When T=0, upon receipt of the packet (0_1) with the output line #3 (o#3) specified as the destination, the packet buffer #0 stores the packet in the logic queue VOQ #3. The request allotment section #0 transmits a request notification to the scheduler section #0 based on the value '0' of the allotment pointer corresponding to T=0.

When T=1, upon receipt of the packet (0_2) with the output line #0 (o#0) specified as the destination, the packet buffer #0 stores the packet in the logic queue VOQ #0. The request allotment section #0 transmits a request notification to the scheduler section #1 based on the value '1' of the allotment pointer corresponding to T=1.

Thus, with the lapse of time T, the value of the allotment pointer is cyclically updated, and a request notification is transmitted to one of the scheduler sections #0 through #3 corresponding to the value. Therefore, when there is no packet arriving when T=3, a request notification is not transmitted to the scheduler section #3 based on the value of 3 of the allotment pointer corresponding to T=3, but a request notification corresponding to the packet arriving subsequently when T=4 (0_4) is transmitted to the scheduler section #0 based on the value of 0 of the allotment pointer corresponding to T=4.

Thus, in each of the input buffer sections #0 through #3, the request notifications to be transmitted from the input buffer sections #0 through #N−1 can be distributed among the scheduler sections #0 through #α−1 by distributing the request notifications generated corresponding to each logic queue VOQ equally to α scheduler sections #0 through #α−1 using an updated allotment pointer corresponding to arrival time T of packets.

Figure 9:
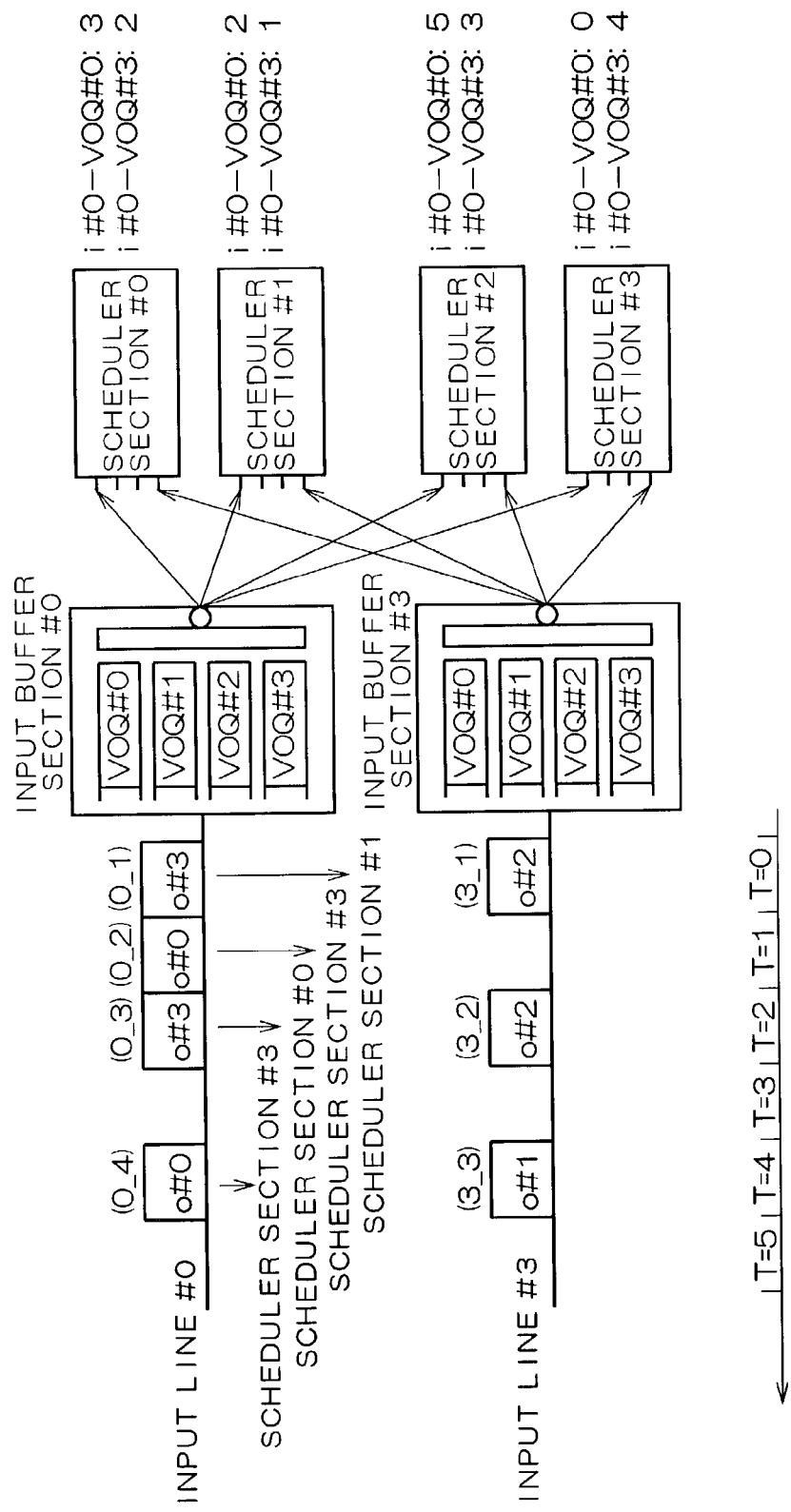
FIG. 9 shows a practical example of distributing request notifications by an input buffer section referring to the number of requests managed by each scheduler section.

When Request Notifications are Distributed by Referring to the Number of Requests Managed by Each Scheduler Section FIG. 9 shows a practical example of distributing request notifications by the input buffer section 20 referring to the number of requests managed by each scheduler section.

Upon receipt of a packet, the request allotment sections #0 through #3 in each of the input buffer sections #0 through #3 refer to the number of the request notifications corresponding to the same combination of an input line and an output line (logic queue VOQ) as the packet in each of the scheduler sections #0 through #3, and determines the scheduler section having the smallest number of requests as the destination of the request notification corresponding to the received packet. To the right of the four scheduler sections #0 through #3 shown in FIG. 9, the number of requests corresponding to the combination of the input line #0 and the logic queue VOQ is shown. Described below are the practical operations of the request allotment section #0 in the input buffer section #0.

When T=0, upon receipt of the packet (0_1) with the output line #3 (o#3) specified as the destination, the packet buffer #0 stores the packet in the logic queue VOQ #3. The request allotment section #0 checks the number of the requests indicating the same input line #0 and destination output line #3 (logic queue VOQ #3) by obtaining the information held by the request management sections #0 through #3 in the four scheduler sections #0 through #3, selects the scheduler section 30 having the smallest number of requests, and transmits the request notification to the selected scheduler section.

The similar processes are performed when and after T=1, that is, the scheduler sections #0 through #3 currently having the smallest number of corresponding request notifications is selected, and the request notification is transmitted to the selected scheduler section.

Thus, each of the input buffer sections #0 through #N−1 obtains the number of requests managed by all scheduler sections #0 through #α−1, and transmits the request notification to the scheduler section having the smallest number of requests, thereby distributing the request notifications transmitted from each of the input buffer sections #0 through #N−1 equally among the α scheduler sections #0 through #α−1.

Distribution and Assignment of the Function of Managing the Number of Requests

Described below is the method of allotting requests when the functions of managing the number of requests are distributed and assigned to both scheduler section 30 and input buffer section 20 without managing the number of requests only by each scheduler section 30. It is assumed that the request number management section 32 in each scheduler section 30 has the request managing function of managing the number of requests for the minimal number. The request allotment section 24 in each input buffer section 20 has the function of managing the number of requests transmitted to each scheduler section 30 for each logic queue VOQ (realized by a sub-request counter), and the function of managing the number of requests which have not been notified yet (realized by a request counter).

For example, when the request number management section 32 in each scheduler section 30 has the function of managing two request notifications for each logic queue VOQ, the scheduler section 30 having a corresponding logic queue VOQ receiving less than two requests is selected when the request allotment section 24 in the input buffer section 20 transmits a request notification to any of the scheduler sections 30. When all scheduler sections 30 have two request notifications for the logic queue VOQ, the input buffer section 20 does not transmit a request notification, increments the request counter corresponding to the logic queue VOQ, and transmits the request notification when the number of requests is less than 2.

FIGS. 10 through 14 show practical examples of distributing and assigning the function of managing the number of requests to the input buffer section 20 and the scheduler section 30. In FIGS. 10 through 14, one logic queue VOQ #a is considered in the input buffer section #0 corresponding to the input line #0 (i#0) for simple explanation. In the examples, the number of scheduler sections 30 is 4, and the maximum value of the number of managed requests on the scheduler section 30 side is 2.

Figure 10:
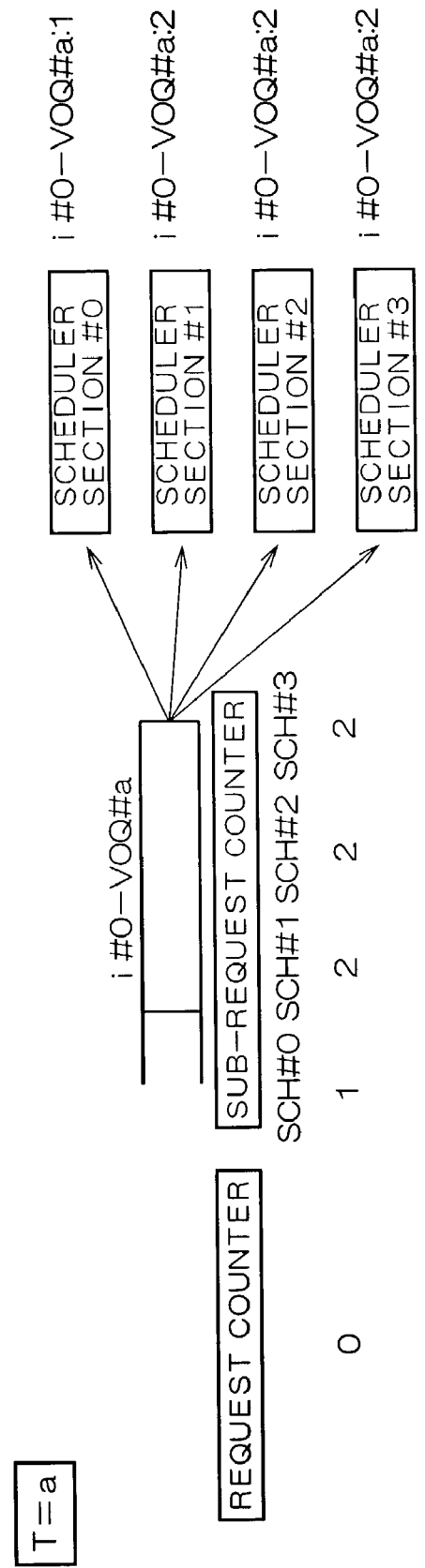
FIG. 10 shows a practical example when the function of managing the number of requests are distributed and assigned to the input buffer sections and the scheduler sections.

For example, as shown in FIG. 10, in the initial status when T=a, the scheduler section #0 (SCH#0) has a request notification corresponding to the input line #0 and the logic queue VOQ #a, and other scheduler sections #1 to #3 (SCH#1 through SCH#3) include two request notifications each.

Figure 11:
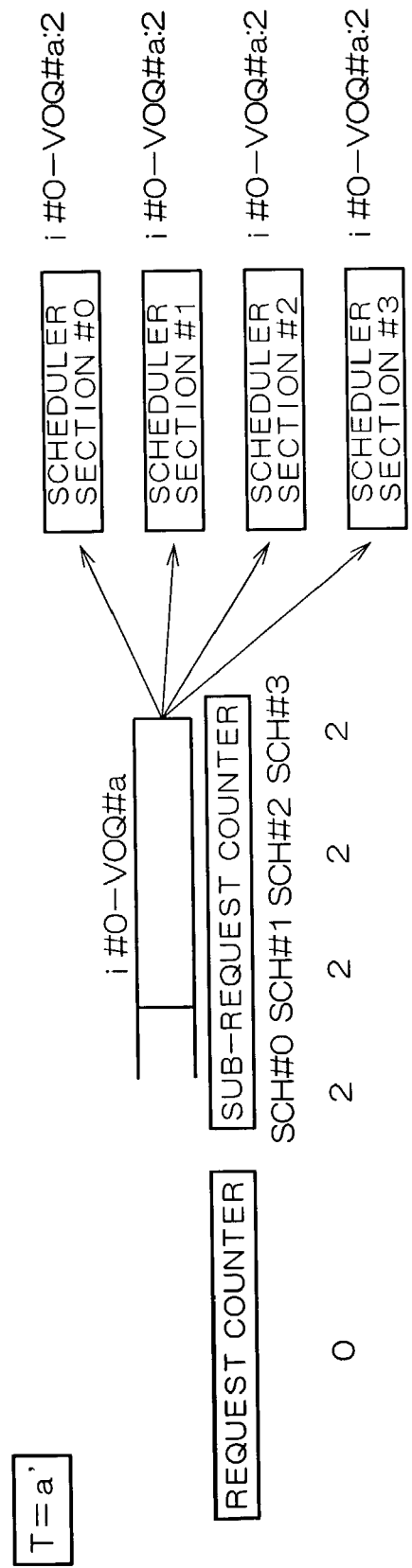
FIG. 11 shows a practical example when the function of managing the number of requests are distributed and assigned to the input buffer sections and the scheduler sections.

In this status, when a new packet is received, the request allotment section #0 transmits a request notification to the scheduler section #0 (SCH#0) having the number of requests of smaller than 2 and having the smallest number of requests, and updates the value of the sub-request counter corresponding to the scheduler section #0 into 2. As a result, as shown in FIG. 11, there are two request notifications each in all scheduler sections #0 through #3 when T=a'.

Figure 12:
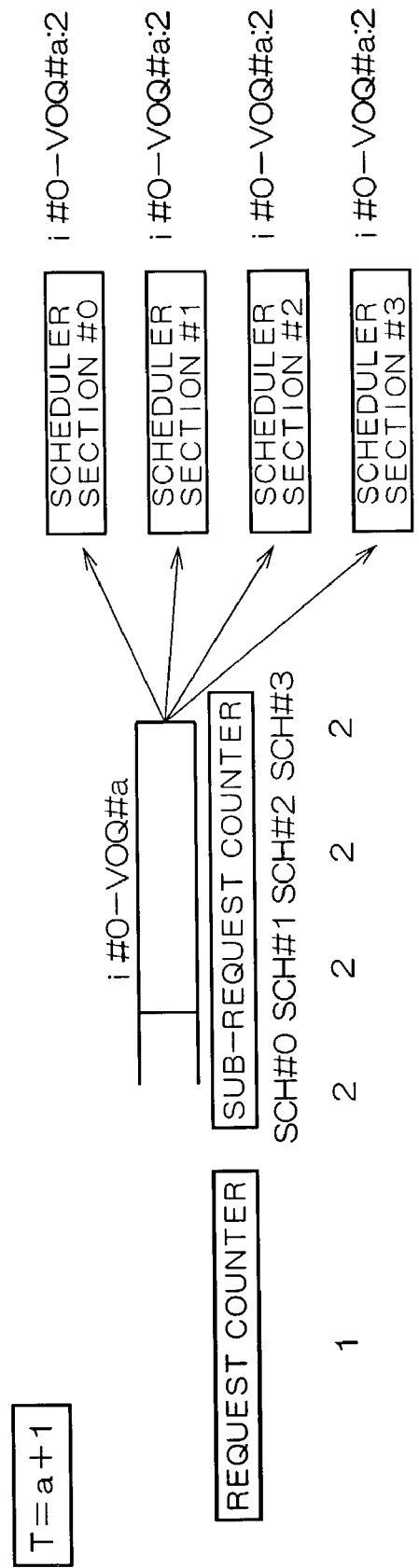
FIG. 12 shows a practical example when the function of managing the number of requests are distributed and assigned to the input buffer sections and the scheduler sections.

Next, although a new packet is received when T=a+1, the request allotment section #0 does not transmit a new request notification because all scheduler sections #0 through #3 have two request notifications each, but increments the value of the request counter provided to manage the number of the requests which have not been notified yet (FIG. 12).

Figure 13:
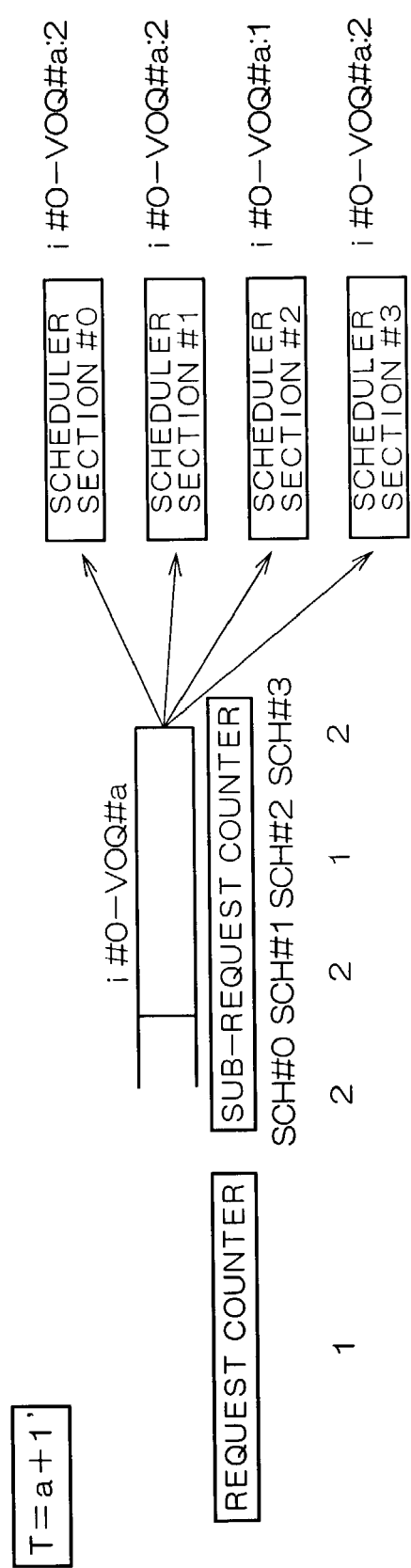
FIG. 13 shows a practical example when the function of managing the number of requests are distributed and assigned to the input buffer sections and the scheduler sections.

Then, if a grant notification is received from the scheduler section #2 to the input buffer section #0, and a packet is read from the logic queue #a in the input buffer section #0 and transmitted to the output line #a, then the request allotment section #0 decrements the value of the sub-request counter corresponding to the scheduler section #2. As a result, as shown in FIG. 13, the value of the sub-request counter is changed into 1 when T=a+1'.

Figure 14:
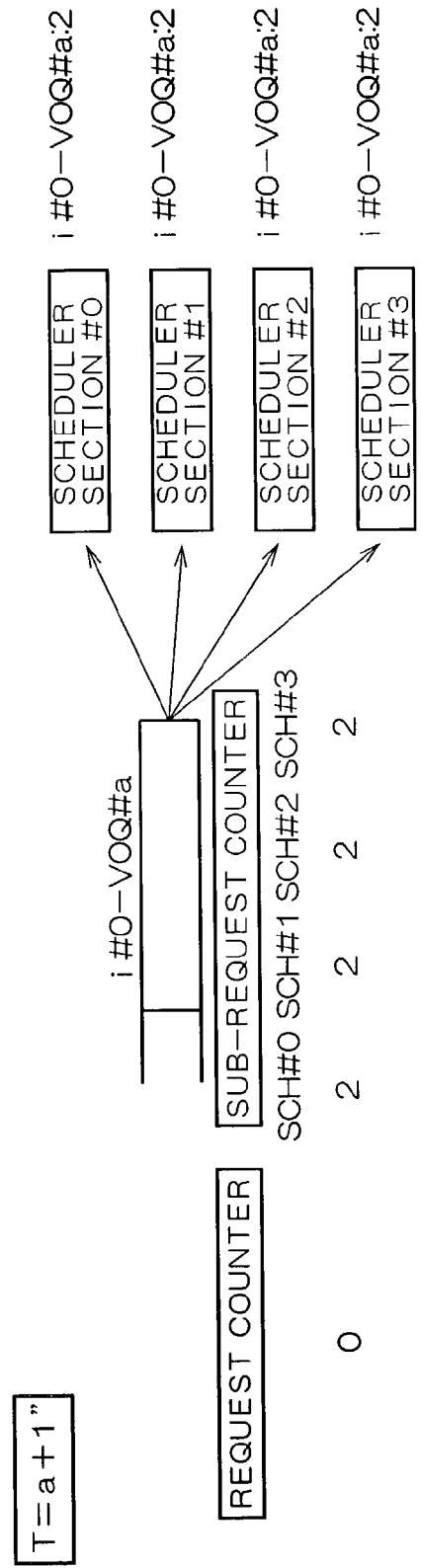
FIG. 14 shows a practical example when the function of managing the number of requests are distributed and assigned to the input buffer sections and the scheduler sections.

Next, when the request allotment section #0 detects that the value of the request counter is equal to or larger than 1, and that the value of the sub-request counter corresponding to the scheduler section #2 is smaller than 2, it transmits a request notification to the scheduler section #2. In addition, after issuing a request notification (T=a+1"), as shown in FIG. 14, the request allotment section #0 increments the value of the sub-request counter corresponding to the scheduler section #2 into 2, and simultaneously decrements the value of the request counter into 0.

Thus, by managing the number of requests by each of the input buffer sections #0 through #3, each of the scheduler sections #0 through #3 can perform the scheduling process only by managing a small number of requests, thereby reducing the load of the process performed by the scheduler sections #0 through #3.

Redundant Configuration of the Scheduler Section

Described below is the redundant configuration provided the scheduler sections 30 of more than necessary number.

Figure 15:
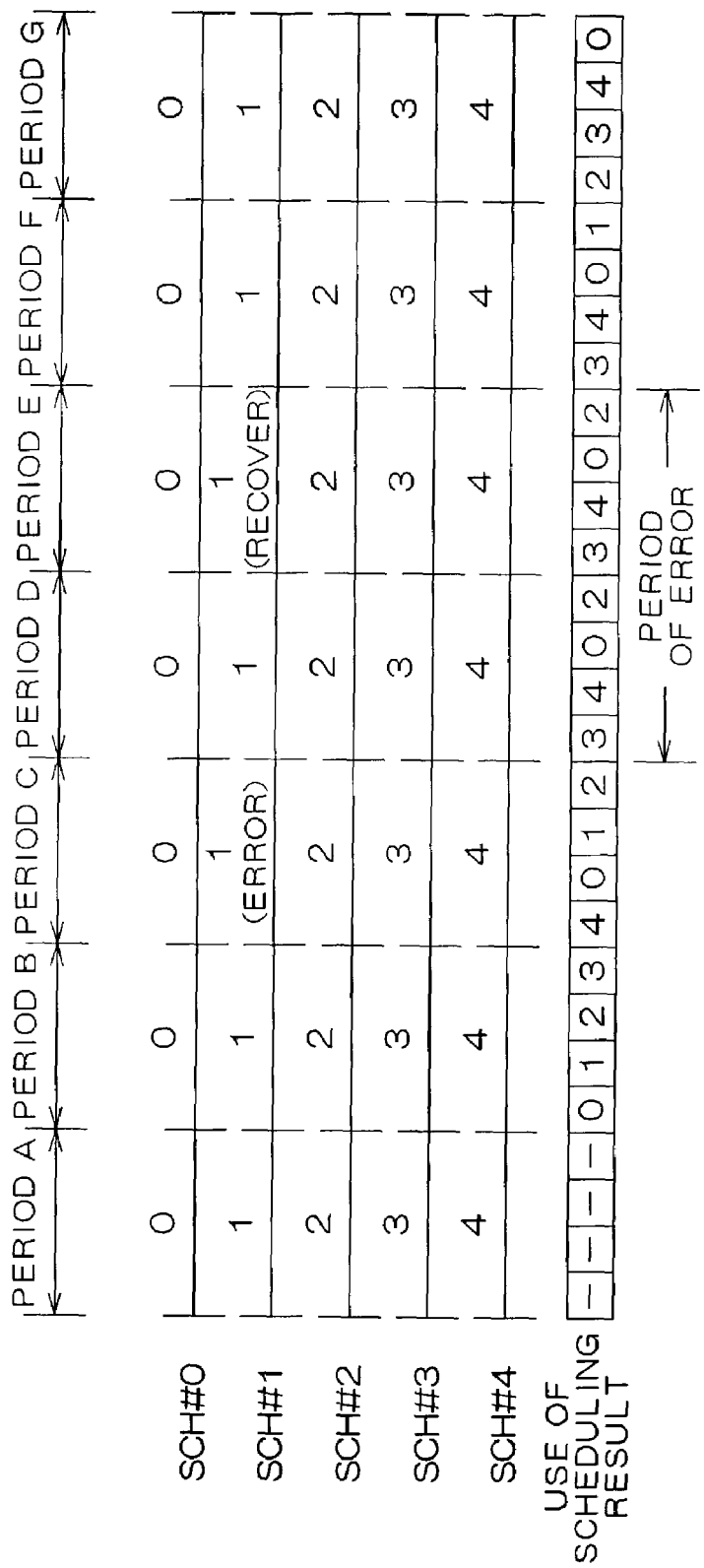
FIG. 15 shows a practical example the scheduler sections of a redundant system are not fixed.

FIG. 15 shows a practical example when the scheduler sections 30 in the redundant system are not fixed. For example, each period corresponds to 4 packet hours, and the number of scheduler sections 30 is 5.

In case where the 5 scheduler sections #0 through #4 (SCH#0 through SCH#4) are normally operated, they independently perform the scheduling processes, and the scheduling results of all scheduler sections #0 through #4 are cyclically used. Each of the scheduler sections #0 through #4 can perform one scheduling process in 4 packet hours. However, in the example shown in FIG. 15, the scheduling result of each of the scheduler sections #0 through #4 is used every 5 packet hours.

Afterwards, if there occurs an error in the scheduler section #1 (SCH#1) in the period C, each input buffer section 20 does not use the scheduling result of the scheduler section #1, but cyclically uses only the scheduling results of the other scheduler sections #0, and #2 to #4.

If the scheduler section #1 has recovered from the error in the period E, each of the input buffer sections 20 starts cyclically using the scheduling results of all scheduler sections #0 through #4 from the next period F.

FIG. 16 shows an example of the operations when the scheduler sections 30 in the redundant system are fixed. For example, the scheduler section #4 (SCH#4) is provided in a redundant (standby) system for use only when a error, etc. occurs.

When the four scheduler sections #0 through #3 are normally operated, each of them independently performs the scheduling process, and each of the results of the four scheduler sections #0 through #3 is cyclically used. The operations in this case are the same as those performed when the scheduler section #4 of the redundant system is not provided.

Then, if an error occurs in the scheduler section #1 (SCH#1) in the period C, the scheduler section #1 is replaced with the scheduler section #4 in the redundant system. Since the entire operations are perform only with the scheduler section #4 replacing the scheduler section #1 having the same function, almost the same scheduling process can be continued as in the case where no error exists.

In addition, if the scheduler section #1 has recovered from the error in the period E, then the scheduler section #4 in the redundant system enters again a standby state, the scheduler section #1 is used, and the scheduling process continues.

Thus, by adopting the redundant configuration comprising the scheduler sections 30 larger in number than the packet hours required for the scheduling process, the redundant scheduler sections 30 (one section in the examples shown in FIGS. 15 and 16) can replace a faulty section, thereby successfully continuing the scheduling process without delay.

Extensibility of Scheduler Section Then, described below is the extensibility when the number of the scheduler sections 30 is changed depending on the number of input lines and output lines accommodated by the packet switch 100 according to the present embodiment. For simple explanation, it is assumed that the maximum switch is set to 4×4 (number of input lines×number of output lines), the number of the scheduler sections 30 is set to 4, and the time required by each scheduler section 30 to perform the scheduling process is 4 packet hours (=4 Tp). It is also assumed that the scheduling process is performed by a 2×2 packet switch using the above mentioned scheduler section 30.

Figure 17:
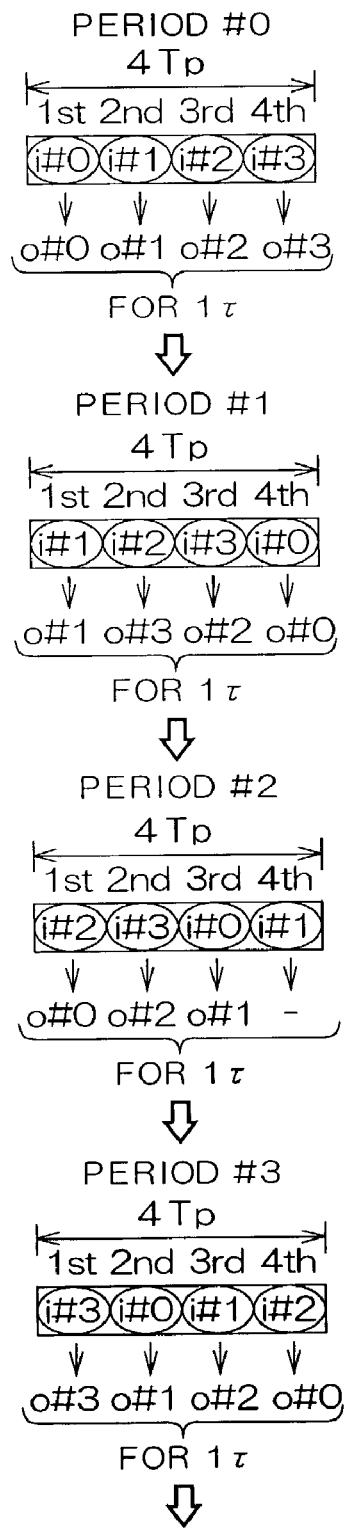
FIG. 17 shows the outline of the scheduling process when the maximum 4×4 packet switch is configured.

FIG. 17 shows the outline of the scheduling process with the configuration of the maximum 4×4 packet switch. For example, a scheduling process is performed on one of the four scheduler sections in the round-robin scheduling system.

In the initial period #0, the scheduling processes are sequentially performed in the order of the input lines #0, #1, #2, and #3. Since the time required by each of the scheduler sections #0 through #3 is 4 packet hours (1τ), each scheduler section obtains a scheduling result every 4 packet hours. In the example shown in FIG. 17, the following scheduling result can be obtained in the period #0.

input line #0 (i#0)→output line #0 (o#0)
input line #1 (i#1)→output line #1 (o#1)
input line #2 (i#2)→output line #2 (o#2)
input line #3 (i#3)→output line #3 (o#3)

In the next period #1, the scheduling processes are sequentially performed in the order of the input lines #1, #2, #3, and #0, and the following scheduling results can be obtained.

input line #1 (i#1)→output line #1 (o#1)
input line #2 (i#2)→output line #3 (o#3)
input line #3 (i#3)→output line #2 (o#2)
input line #0 (i#0)→output line #0 (o#0)

Similarly, in and after the period #2, the output line corresponding to each input line is determined for each period with the cyclic process order of the target input line in the scheduling process.

Thus, in the entire packet switch, four scheduling results can be obtained every 4 packet hours by four scheduler sections #0 through #3. On an average, one scheduling result can be obtained every 1 packet hour, thereby causing no deterioration of throughput.

Figure 18:
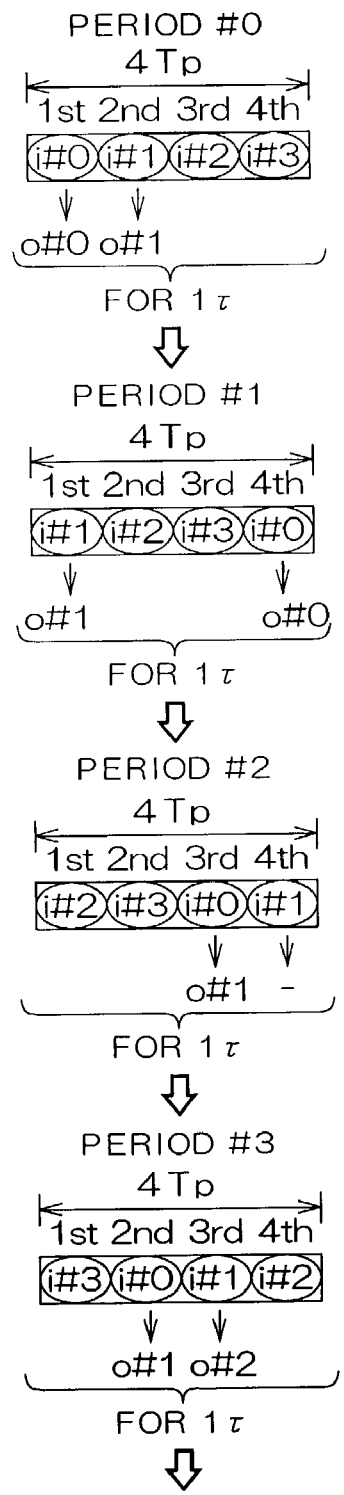
FIG. 18 shows the outline of the scheduling process when a small 2×2 packet switch is configured.

FIG. 18 shows the outline of scheduling process with the configuration of a small 2×2 packet switch. In the practical example shown in FIG. 18, two scheduler sections which are the same as in the maximum configuration are used shown in FIG. 17.

In the initial period #0, the scheduling processes are sequentially performed in the order of the input lines #0 and #1. Each of the two scheduler sections #0 and #1 has the performance of determining the output line corresponding to each of the four input lines. In the example shown in FIG. 18, since there are two target input lines, the scheduling processes are performed on these two input lines every 4 packet hours (1τ), and the following scheduling results are obtained.

input line #0 (i#0)→output line #0 (o#0)
input line #1 (i#1) output line #1 (o#1)

In the period #1, the scheduling processes are sequentially performed in the order of the input lines #1 and #0, and the following scheduling results are obtained.

input line #1 (i#1)→output line #1 (o#1)
input line #0 (i#o)→output line #0 (o#0)

In and after the period #2, the output line corresponding to each input line is determined for each period with the cyclic process order of the target input line in the scheduling process.

Thus, if the number of scheduler sections is reduced with the decreasing number of input lines and output lines, then the throughput is detriorated. That is, the time required to perform the scheduling process by each of the two scheduler sections #0 and #1 is 4 packet hours. In the entire packet switches #0 and #1, two scheduling results are obtained every 4 packet hours. Therefore, for the half of four packet hours, no instruction to transmit a packet can be issued from the scheduler sections #0 and #1 to each of the input buffer sections #0 and #1, thereby halving the throughput deteriorated by half.

Figure 19:
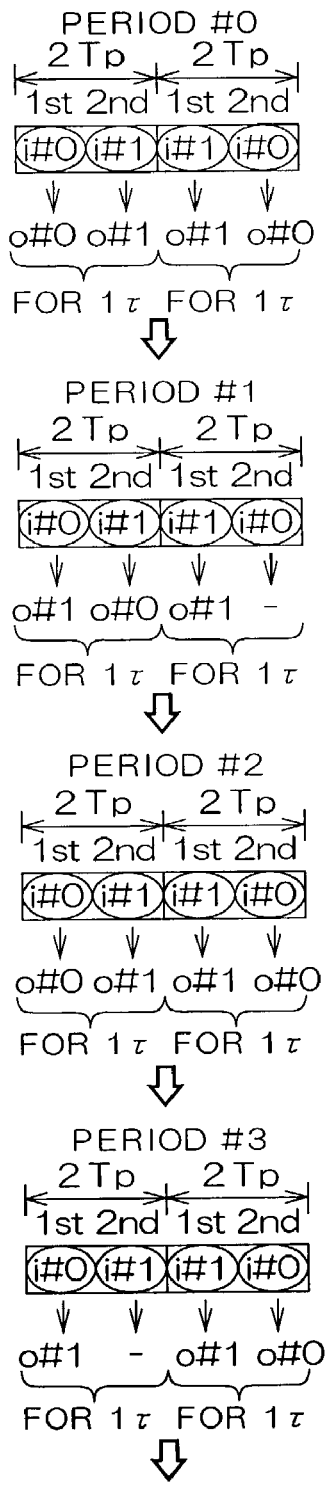
FIG. 19 shows the outline of the scheduling process by a small packet switch with the throughput protected against deterioration.

FIG. 19 shows the outline of the scheduling process using a small packet switch with the throughput protected against deterioration. To perform a scheduling process by two scheduler sections in a 2×2 packet switch without deteriorating the throughput, the time required to perform the scheduling process by each of the scheduler sections #0 and #1 is set to 2 packet hours. Since the target input lines and output line are halved in number, the required time can be changed.

In the first half of the period #0, the scheduling processes are sequentially performed in the order of the input lines #0 and #1, and the following scheduling results are obtained.

input line #0 (i#0)→output line #0 (o#0)
input line #1 (i#1)→output line #1 (o#1)

In the second half of the period #0, the scheduling processes are sequentially performed in the order of the input lines #1 and #0, and the following scheduling results are obtained.

input line #1 (i#1)→output line #1 (o#1)
input line #0 (i#0)→output line #0 (o#0)

Similarly, in and after the period #1, the scheduling processes are separately performed for the first half and the second half of the period. Thus, in the entire packet switch, two scheduling results are obtained every 2 packet hours. On an average, one scheduling result is obtained every packet hour, thereby causing no throughput deterioration.

Figure 20:
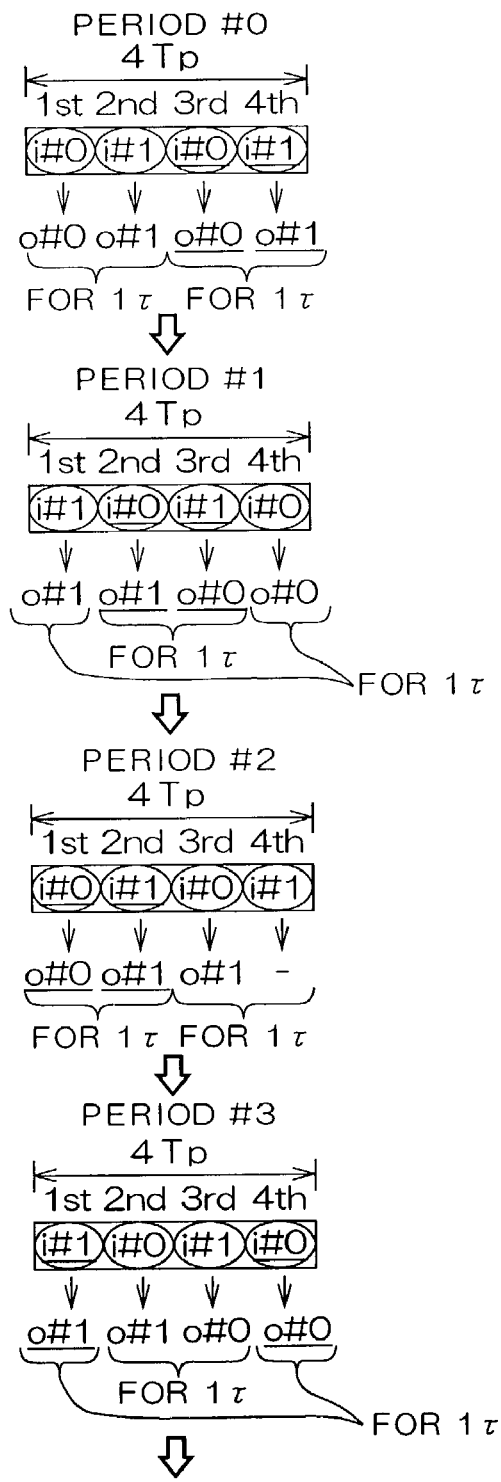
FIG. 20 shows an outline of the scheduling process by a small packet switch with the throughput protected against deterioration.

FIG. 20 shows the outline of the scheduling process using a small packet switch with the throughput protected against deterioration. For example, a scheduling process is performed with the scheduling time of each of the two scheduler sections still set to 4 packet hours without deteriorating the throughput.

Practically, instead of maintaining the scheduling time as is, a plurality of scheduling results are obtained in each period. That is, using a small 2×2 switch, no scheduling processes are performed on the input lines #2 and #3 and the output lines #2 and #3. Therefore, using the processing time for the unused lines, two scheduling results are obtained in one scheduling period (1τ, 4 packet hours).

In FIG. 20, the underlined input lines #0 and #1 (i#0, i#1) indicate that the scheduling processes are performed for the input lines #2 and #3. The output lines #0 and #1 (o#0 and o#1) indicates that, when output lines #2 and #3 are obtained as the first destinations of the packets as a scheduling result, they are respectively replaced with the input lines #0 and #1.

In the initial period #0, the scheduling processes are sequentially performed in the order of the input lines #0, #1, #2, and #3. Since the time required by each of the scheduler sections #0 and #1 is 4 packet hours (1τ), each scheduler section obtains a scheduling result corresponding to the four input lines #0 through #3 every 4 packet hours. As described above, the input lines #2 and #3 are not actually existing, but the scheduling processes are performed on the input lines #0 and #1. As a result, each of the scheduler sections #0 and #1 derives two scheduling results every 4 packet hours. In the example shown in FIG. 20, the following scheduling result can be obtained in the period #0.

Result 1: input line #0 (i#0)→output line #0 (o#0)
Result 1: input line #1 (i#1)→output line #1 (o#1)
Result 2: input line #0 (i#0)→output line #0 (o#0)
Result 2: input line #1 (i#1)→output line #1 (o#1)

In the next period #1, the scheduling processes are sequentially performed in the order of the input lines #1, #2, #3, and #0, and the following scheduling results can be obtained.

Result 1: input line #1 (i#1)→output line #1 (o#1)
Result 2: input line #0 (i#0)→output line #1 (o#1)
Result 2: input line #1 (i#1)→output line #0 (o#0)
Result 1: input line #0 (i#0)→output line #1 (o#1)

Thus, each of the two scheduler sections #0 and #1 derives two scheduling results in 1 period of 4 packet hours. In the entire packet switch, a total of four scheduling results can be obtained by the two scheduler sections #0 and #1 every 4 packet hours. On an average, one scheduling result can be obtained every packet hour, thereby causing no throughput deterioration.

Thus, the packet switch 100 according to the present embodiment sets the number of the scheduler sections depending on the number of input lines and output lines, and changes the time required for a scheduling process of each scheduler section, thereby avoiding throughput deterioration, and realizing the optimum scheduling process. As a result, an extensible packet switch can be realized by decreasing a wasteful configuration.

Described below is a practical example of a scheduling process for deriving a plurality of scheduling results in one period corresponding to a time required for scheduling process by the scheduler section.

Figure 21:
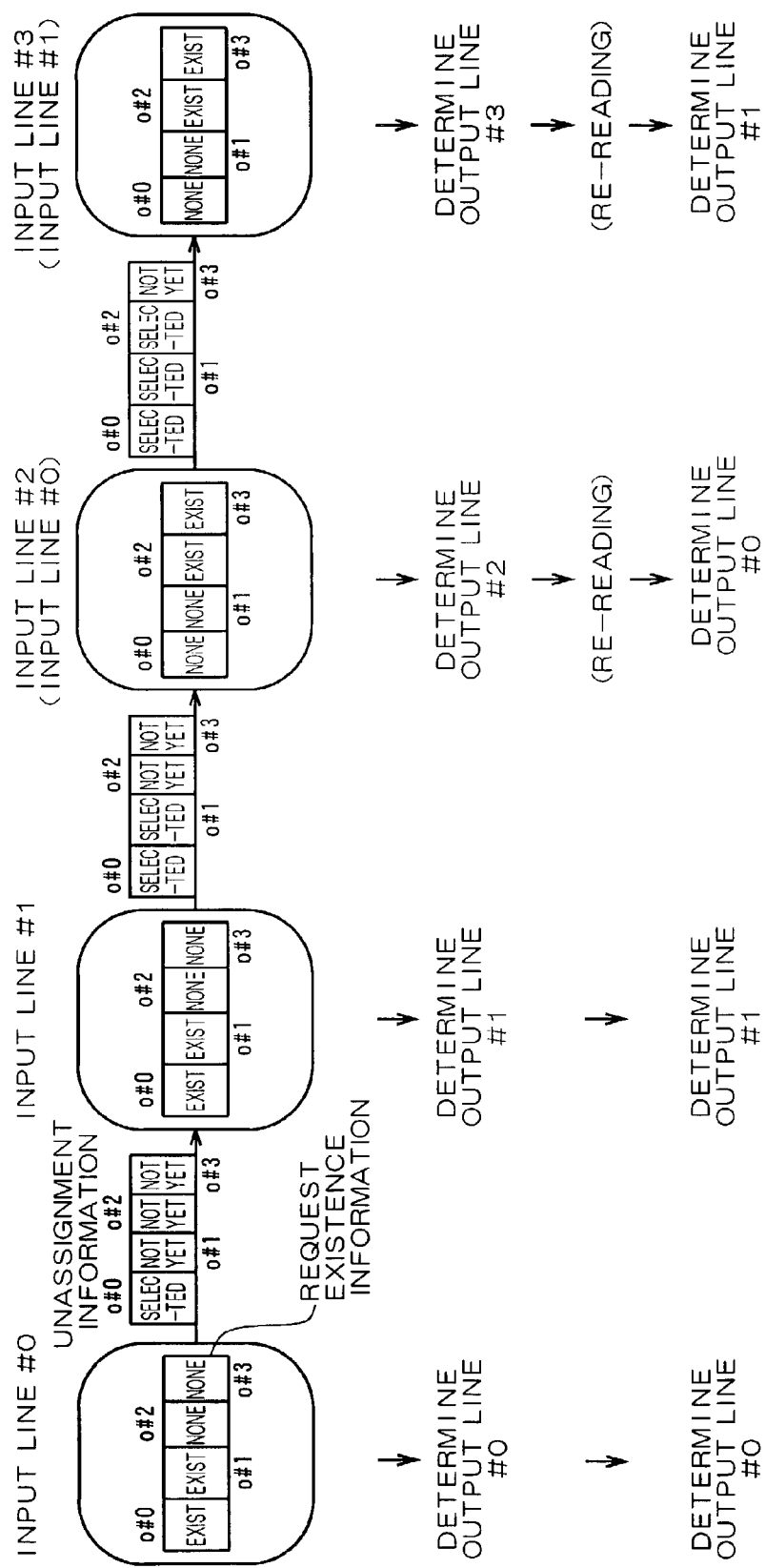
FIG. 21 shows a practical example of the scheduling process of obtaining a plurality of scheduling results in one scheduling period.
Figure 22:
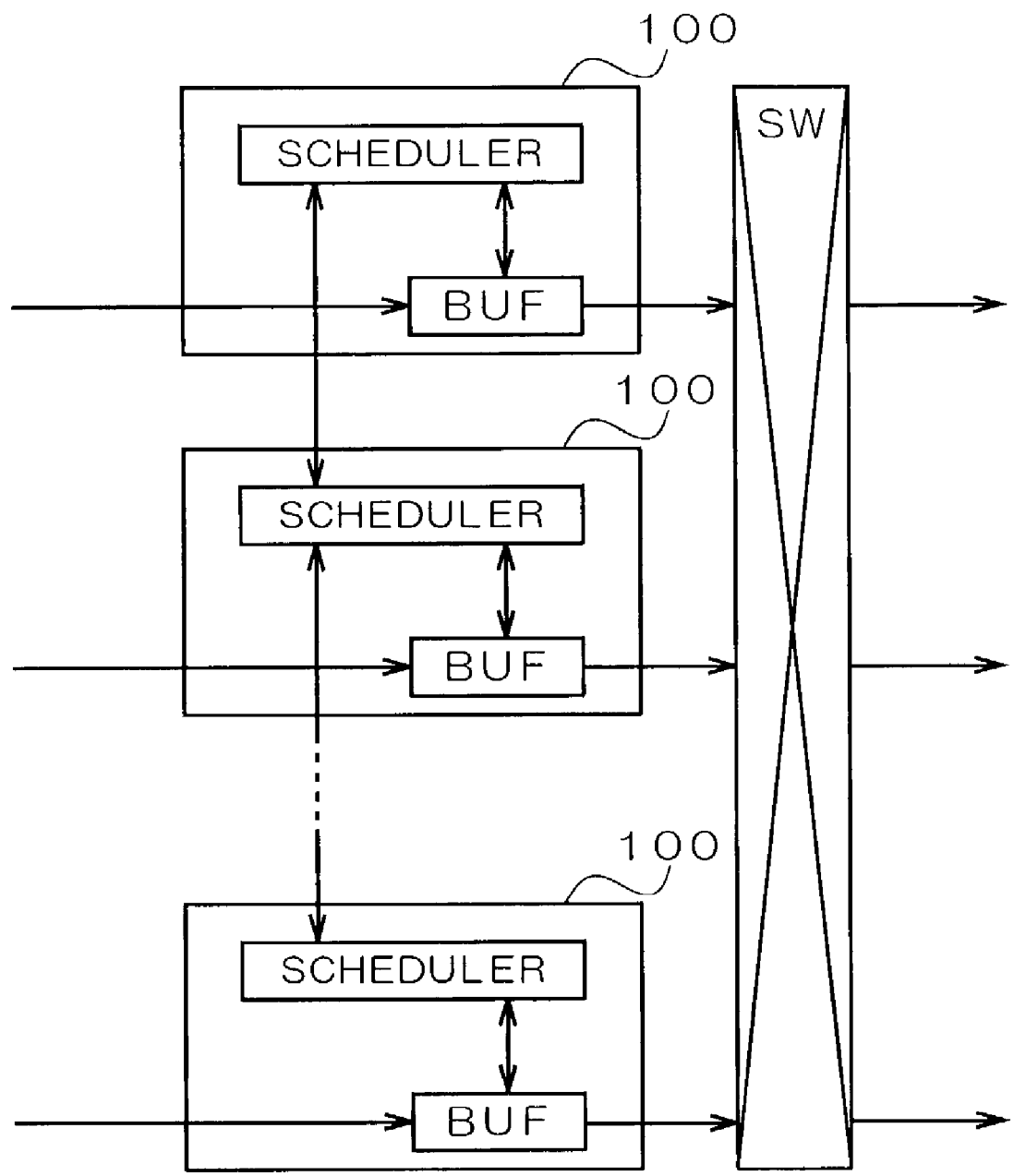
FIG. 22 shows a configuration of a conventional packet switch in which scheduling functions are distributed.
Figure 23:
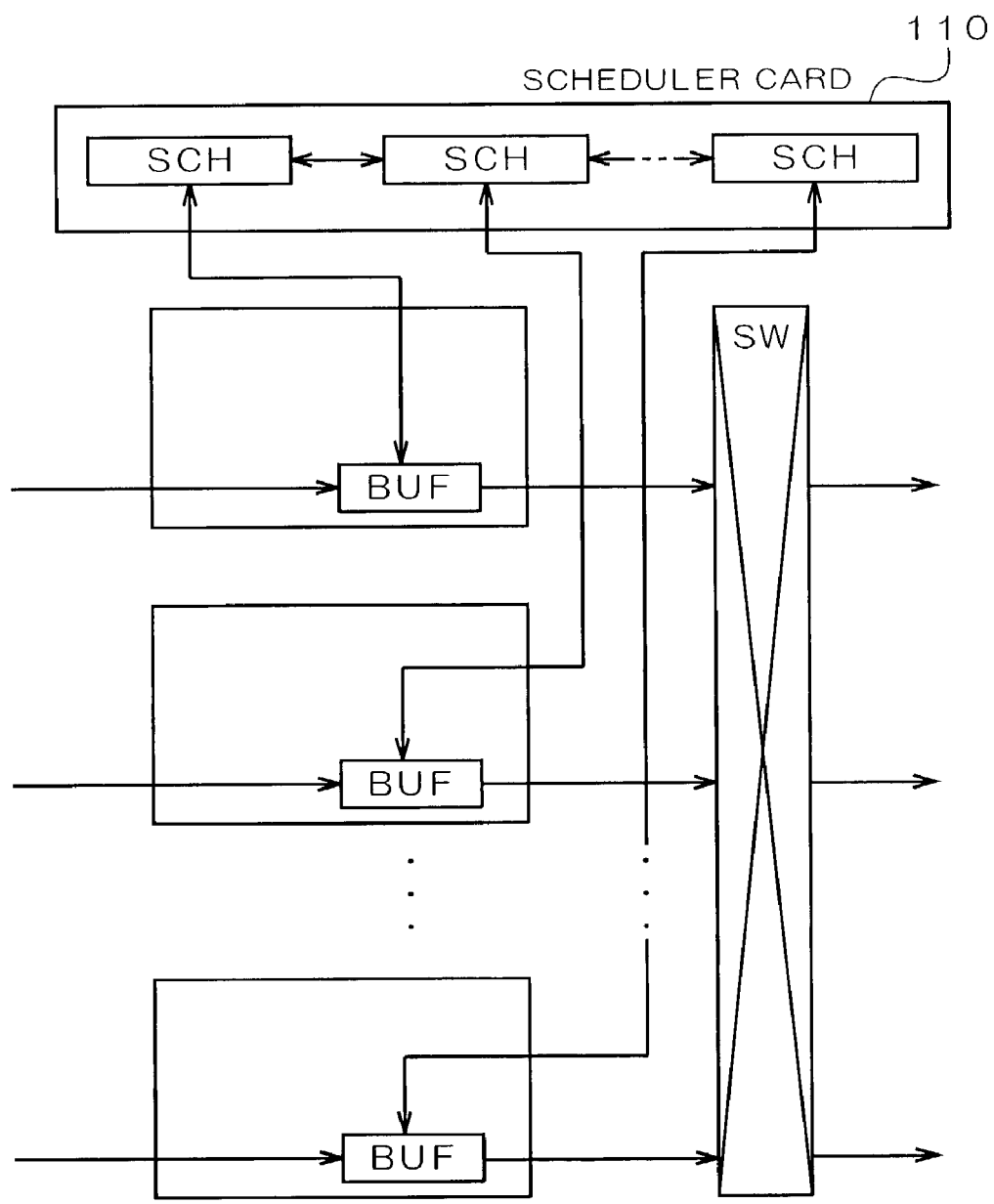
FIG. 23 shows the configuration of the conventional packet switch in which scheduling functions are collectively assigned.

FIG. 21 shows a practical example of a scheduling process of deriving a plurality of scheduling results in one period, and shows a type of contents of the scheduling process in the period #0 shown in FIG. 20. Each of the scheduler sections #0 and #1 manages the existence of a request notification corresponding to the combination of an input line and a logic queue VOQ. For example, for the input line #0, there is a request notification for both output lines #0 and #1. Since a small 2×2 switch is assumed in this example, the input lines #2, #3 and the output lines #2, #3 are not used. Therefore, no request notification instructing one of the input lines #0 and #1 to transmit a packet to one of the output lines #2 and #3 is issued.

Each scheduler section performs a scheduling process corresponding to an unused line to derive a plurality of scheduling results in a period. Practically, the contents of the request notification of the input line #0 are set in a block for performing a process corresponding to the input line #2. At this time, in response to the request notification including the combination of the input line #0 and the output line #0, information about a change into the combination of the input line #2 and the output line #2 is set. In response to the request notification including the combination of the input line #0 and the output line #1, information about a change into the combination of the input line #2 and the output line #3 is set. The practical changes of the combinations are listed below.

i#2-o#0 request existence information←i#0-o#2 request existence information
i#2-o#1 request existence information←i#0-o#3 request existence information
i#2-o#2 request existence information←i#0-o#0 request existence information
i#2-o#3 request existence information←i#0-o#1 request existence information
i#3-o#0 request existence information←i#1-o#2 request existence information
i#3-o#1 request existence information←i#1-o#3 request existence information
i#3-o#2 request existence information←i#1-o#0 request existence information
i#3-o#3 request existence information←i#1-o#3 request existence information where i#2, etc. indicates an input line number, o#0, etc. indicates an output line number, and the request existence information indicates the existence of a request.

The procedure of a practical scheduling process is described below by referring to FIG. 21.

The first scheduling target is the input line #0 on which the scheduling process is performed by selecting one output line which has not been selected and has received a request notification. In the example shown in FIG. 21, the output line #0 is selected. Thus the selected output line #0 is reflected in the unassignment information as having being selected, and then passed to the scheduling process to be performed on the next scheduling target.

The second scheduling target is the input line #1 on which the scheduling process is performed by selecting one output line which has not been selected and has received a request notification. In the example shown in FIG. 21, since the output line #0 has been selected, the output line #1 is selected. Thus the selected output line #1 is reflected in the unassignment information as having being selected, and then passed to the scheduling process to be performed on the next scheduling target.

The third scheduling target is the input line #2. As described above, the request existence information set for the input line #2 corresponds to the input line #0. Therefore, the scheduling process is actually performed on the input line #0. The scheduling process on the input line #2 is performed by selecting an output line which has received a request notification and has not been selected yet. In the example shown in FIG. 21, the output lines which have received a request notification and have not been selected yet are the output line #2 and #3. In this example, the output line #2 has been selected. Thus the selected output line #2 is reflected in the unassignment information as having being selected, and then passed to the scheduling process to be performed on the next scheduling target.

The output line #2 is actually unused. In the scheduling process performed on such unused lines, a selected output line number is not passed as is to the input buffer section 20, but an output line number is passed after performing a re-reading process. That is, the input line #2 is re-read into the input line #0, and the output line #2 is re-read into the output line #0 and then passed. The correspondence between input lines and output lines to be re-read is shown below.

i#2-o#2→i#0-o#0
i#2-o#3→i#0-o#1
i#3-o#2→i#1-o#0
i#3-o#3→i#1-o#1

Similarly, the scheduling process is performed on the input line #3 which is the fourth scheduling target. As a result, the output line #3 is selected. Since the input line #3 and the output line #3 are unused lines, they are actually re-read into the input line #1 and the output line #1, and passed to the input buffer section 20.

Thus, a plurality of results can be obtained in one period of the scheduling process by performing the scheduling process using an unused line.

The invention claimed is:

1. A packet switch, comprising:
N input buffer sections, provided corresponding to N input lines, for storing a packet input through the corresponding input lines;
$\alpha$ scheduler sections, connected to each of said N input buffer sections, for determining one of M output lines as a destination of the packet stored in each of said N input buffer sections by a scheduling process independently performed by each scheduler section, the time required by the scheduling process being longer than a shortest transmission interval of the packet; and
a switch section, connected to each of said N input buffer section, for outputting the packet output from each of said N input buffer sections to the destination output line determined by said scheduler section,
wherein results of scheduling processes by said $\alpha$ scheduler sections are cyclically used at a timing different with each other.

2. The packet switch according to claim 1, wherein:
said scheduling process in performed by said scheduler section corresponding to a scheduling request notification transmitted from said N input buffer sections; and
each of said N input buffer sections distributes the scheduling request notifications among said scheduler sections as a destination.

3. The packet switch according to claim 2, wherein said input buffer sections have M queues storing packets to be transmitted to the M output lines, and said scheduler sections, which are destinations of the scheduling request notifications, cyclically correspond to the M numbers of each queue.

4. The packet switch according to claim 2, wherein said input buffer sections have said scheduler sections, which are destinations of the scheduling request notifications, cyclically correspond to the each input lines.

5. The packer switch according to claim 2, wherein said input buffer sections have said scheduler sections, which are destinations of the scheduling request notifications, cyclically correspond to each of a unit time.

6. The packer switch according to claim 2, wherein said input buffer sections check a number of unassigned scheduling request notifications for each of said a scheduler sections, and transmit a next scheduling request notification to the scheduler section having smaller number of scheduling request notifications.

7. The packet switch according to claim 2, wherein said input buffer sections manage a number of scheduling request notifications transmitted to each of said $\alpha$ scheduler sections, and delay an operation of transmitting the scheduling request notification to the scheduler section whose number of the scheduling request notifications has reached a predetermined value until the number becomes smaller than the predetermined value.

8. The packer switch according to claim 1, wherein when a time required by said scheduler section to perform the scheduling process is L times as long as a shortest transmission interval of the packet, the number $\alpha$ of scheduler sections is set to a value equal to or larger than the multiple L.

9. The packet switch according to claim 8, wherein:
$\alpha$-L is set to a value equal to or larger than 1; and
said N input buffer sections cyclically use results of all scheduling processes of said $\alpha$ scheduler sections.

10. The packet switch according to claim 8, wherein:
$\alpha$-L is set to a value equal to or larger than 1; and
$\alpha$-L scheduler sections are used as a redundant system, and said scheduler sections in the redundant system replace when a scheduler section which is not included in the sections in the redundant system becomes faulty.

11. The packet switch according to claim 1, wherein said number $\alpha$ of said scheduler sections and the time of the scheduling process are set variable depending on the number N of the input lines and the number M of the output lines.

12. The packet switch according to claim 1, wherein said scheduler section performs the scheduling process including an unused line, and performs a re-reading process among the actually used input and output lines and the unused lines, thereby obtaining a plurality of scheduling process results by performing one scheduling process.

13. A packet switch, comprising:
N input buffer sections, provided corresponding to N input lines, for storing a packet input through the corresponding input lines; $\alpha$ scheduler sections for determining one of M output lines as a destination of the packet stored in each of said N input buffer sections by a scheduling process independently performed by each scheduler section; and
a switch section for outputting the packer output from each of said N input buffer sections to the destination output line determined by said scheduler section,
wherein said N input buffer sections cyclically use results of scheduling processes by said $\alpha$ scheduler sections, and
when a time required by said scheduler section to perform the scheduling process is L times as long as a shortest transmission interval of the packet, the number $\alpha$ of scheduler sections is set to a value equal to or larger than the multiple L.

14. A packet switch, comprising:
N input buffer sections, provided corresponding to N input lines, for storing a packet input through the corresponding input lines;
$\alpha$ scheduler sections for determining one of M output lines as a destination of the packer stored in each of said N input buffer sections by a scheduling process independently performed by each scheduler section; and
a switch section for outputting the packet output from each of said N input buffer sections to the destination output line determined by said scheduler section,
wherein said N input buffer sections cyclically use results of scheduling processes by said $\alpha$ scheduler section, and
said scheduler section performs the scheduling process including an unused line, and performs a re-reading process among the actually used input and output lines and the unused lines, thereby obtaining a plurality of scheduling process results by performing one scheduling process.

* * * * *